United States Patent
Bansal et al.

(10) Patent No.: US 10,659,441 B2
(45) Date of Patent: *May 19, 2020

(54) DYNAMICALLY MANAGING, FROM A CENTRALIZED SERVICE, VALID CIPHER SUITES ALLOWED FOR SECURED SESSIONS

(71) Applicant: INTERNATIONAL BUSINESS MACHINES CORPORATION, Armonk, NY (US)

(72) Inventors: Rinkesh I. Bansal, Pune (IN); Shiv S. Jha, Pune (IN); Sanjay B. Panchal, Mumbai (IN); Mahesh S. Paradkar, Pune (IN); Chintan Thaker, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,619

(22) Filed: Dec. 10, 2018

(65) Prior Publication Data

US 2019/0199696 A1    Jun. 27, 2019

Related U.S. Application Data

(63) Continuation of application No. 15/332,234, filed on Oct. 24, 2016, now Pat. No. 10,218,686.

(51) Int. Cl.
*H04L 29/06*      (2006.01)
*H04L 9/08*      (2006.01)
(Continued)

(52) U.S. Cl.
CPC .......... *H04L 63/061* (2013.01); *H04L 9/0891* (2013.01); *H04L 9/16* (2013.01);
(Continued)

(58) Field of Classification Search
CPC combination set(s) only.
See application file for complete search history.

(56) References Cited

U.S. PATENT DOCUMENTS 7,139,918 B2    11/2006    Chang et al.
8,086,846 B2    12/2011    Brabson et al.
(Continued)

OTHER PUBLICATIONS

IBM Knowledge Center—Cipher Suites, last updated Jul. 10, 2016, accessed via the Internet <http://www.ibm.com/support/knowledgecenter/en/SSGMCP_5.3.0/com.ibm.cics.ts.racfsecurity.doc/topics/dfht5nv.html> as of Sep. 23, 2016, 2 pages.
(Continued)

*Primary Examiner* — Malcolm Cribbs
(74) *Attorney, Agent, or Firm* — Jeffrey S. LaBaw; Amy J. Pattillo

(57) ABSTRACT

A service interface of an SSL application hosted on at least one computer system in a hosted network selecting at least one authorized cipher suite. An SSL socket of the SSL application negotiating with another SSL socket of another SSL application in the hosted network for a mutual cipher from among the at least one authorized cipher suite and a shared key to encrypt information exchanged during a secure session. Responsive to establishing a security connection between the SSL socket and the another SSL socket using the selected mutual cipher, the service interface sends to a centralized service an identifier of the selected mutual cipher. Responsive to the service interface receiving a revoked cipher alert from the centralized service, the service interface revokes one or more sessions of the SSL application using a revoked cipher in the revoked cipher alert matching the selected mutual cipher.

20 Claims, 9 Drawing Sheets

(51) Int. Cl.
*H04L 9/16* (2006.01)
*H04L 9/32* (2006.01)

(52) U.S. Cl.
CPC ............ *H04L 9/3268* (2013.01); *H04L 63/08* (2013.01); *H04L 63/166* (2013.01); *H04L 63/205* (2013.01); *H04L 63/0428* (2013.01)

(56) References Cited

U.S. PATENT DOCUMENTS

| | | | |
|---|---|---|---|
| 9,288,234 B2 | 3/2016 | Barr et al. | |
| 9,888,037 B1* | 2/2018 | Sharifi Mehr | .......... H04L 63/18 |
| 9,923,923 B1* | 3/2018 | Sharifi Mehr | ........ H04L 63/166 |
| 2001/0005885 A1 | 6/2001 | Eigamal et al. | |
| 2001/0023482 A1* | 9/2001 | Wray | .................. H04L 63/0281 |
| | | | 713/151 |
| 2006/0262932 A1 | 11/2006 | Sood et al. | |
| 2015/0113264 A1 | 4/2015 | Wang et al. | |
| 2015/0271145 A1 | 9/2015 | Jalisatgi et al. | |
| 2015/0271171 A1 | 9/2015 | Rakshit et al. | |
| 2016/0028698 A1 | 1/2016 | Antipa et al. | |
| 2016/0044023 A1 | 2/2016 | Barr et al. | |
| 2016/0241389 A1 | 8/2016 | Le Saint et al. | |
| 2017/0214717 A1* | 7/2017 | Bush | ..................... H04L 63/107 |
| 2018/0115521 A1 | 4/2018 | Bansal et al. | |

OTHER PUBLICATIONS

IBM Knowledge Center, SSL configuration settings, last updated Aug. 9, 2016, accessed via the Internet <http://www.ibm.com/support/knowledgecenter/SSAW57_8.5.5/com.ibm.websphere.nd.doc/ae/usec_sslnewdynendconf.html> as of Sep. 23, 2016, 2 pages.
Common Vulnerabilities and Exposures, accessed via the Internet >https://cve.mitre.org/cve/> as of Oct. 21, 2016, 2 pages.
Non-final Office Action, dated May 8, 2018, U.S. Appl. No. 15/332,234, filed Oct. 24, 2016, In re Bansal, 21 pages.
Notice of Allowance, dated Oct. 11, 2018, U.S. Appl. No. 15/332,234, filed Oct. 24, 2016, In re Bansal, 7 pages.
"List of IBM Patents or Patent Applications Treated as Related", dated Dec. 10, 2018, 2 pages.

* cited by examiner

DYNAMICALLY MANAGING, FROM A CENTRALIZED SERVICE, VALID CIPHER SUITES ALLOWED FOR SECURED SESSIONS

CROSS REFERENCE TO RELATED APPLICATIONS

This application is a continuation of commonly assigned U.S. patent application Ser. No. 15/332,234, filed Oct. 24, 2016, which is hereby incorporated herein by reference.

BACKGROUND

1. Technical Field

The embodiment of the invention relates generally to data processing and particularly to dynamically managing, from a centralized service, valid cipher suites allowed for secured sessions.

2. Description of the Related Art

Security protocols, such as secure socket layer (SSL) and transport layer security (TLS), provide a mechanism for securing data sent over networks between clients and servers by encrypting the data. During a negotiation of a secured connection session between a client and server over a network using an SSL/TLS protocol, such as during an SSL handshake, the client and server exchange information about which cipher suites they have in common and mutually select a particular cipher suite for securing the session. A cipher suite is a named combination of authentication, encryption, and message authentication code (MAC) and key exchange algorithms used to negotiate security settings for a network connection using the SSL/TLS network protocol. Each cipher suite provides a different level of security.

BRIEF SUMMARY

In one or more embodiments, a method is directed to selecting, by a service interface of a secure socket layer (SSL) application hosted on at least one computer system in a hosted network, at least one authorized cipher suite. The method is directed to negotiating, by an SSL socket of the SSL application with another SSL socket of another SSL application in the hosted network for a mutual cipher from among the at least one authorized cipher suite and a shared key to encrypt information exchanged during a secure session. The method is directed to, responsive to establishing a security connection between the SSL socket and the another SSL socket using the selected mutual cipher, sending, by the service interface to a centralized service an identifier of the selected mutual cipher. The method is directed to, responsive to receiving, by the service interface, a revoked cipher alert from the centralized service, revoking one or more sessions of the SSL application using a revoked cipher in the revoked cipher alert matching the selected mutual cipher.

In addition, in one or more embodiments, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to select, by a service interface of a secure socket layer (SSL) application hosted on at least one computer system in a hosted network, at least one authorized cipher suite. The stored program instructions comprise program instructions to negotiate, by an SSL socket of the SSL application with another SSL socket of another SSL application in the hosted network for a mutual cipher from among the at least one authorized cipher suite and a shared key to encrypt information exchanged during a secure session. The stored program instructions comprise program instructions to, responsive to establishing a security connection between the SSL socket and the another SSL socket using the selected mutual cipher, send, by the service interface to a centralized service an identifier of the selected mutual cipher. The stored program instructions comprise program instructions to, responsive to receiving, by the service interface, a revoked cipher alert from the centralized service, to revoke one or more sessions of the SSL application using a revoked cipher in the revoked cipher alert matching the selected mutual cipher.

In addition, in one or more embodiments, a computer program product comprises one or more computer-readable storage devices and program instructions, stored on at least one of the one or more storage devices. The stored program instructions comprise program instructions to select, by a service interface of a secure socket layer (SSL) application hosted on at least one computer system in a hosted network, at least one authorized cipher suite. The stored program instructions comprise program instructions to negotiate, by an SSL socket of the SSL application with another SSL socket of another SSL application in the hosted network for a mutual cipher from among the at least one authorized cipher suite and a shared key to encrypt information exchanged during a secure session. The stored program instructions comprise program instructions to, responsive to establishing a security connection between the SSL socket and the another SSL socket using the selected mutual cipher, send, by the service interface to a centralized service an identifier of the selected mutual cipher. The stored program instructions comprise program instructions to, responsive to receiving, by the service interface, a revoked cipher alert from the centralized service, to revoke one or more sessions of the SSL application using a revoked cipher in the revoked cipher alert matching the selected mutual cipher.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of one or more embodiments of the present invention. It will be apparent, however, to one skilled in the art that the one or more embodiments of the present invention may be practiced without these specific details. In other instances, well-known structures and devices are shown in block diagram form in order to avoid unnecessarily obscuring the one or more embodiments of the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
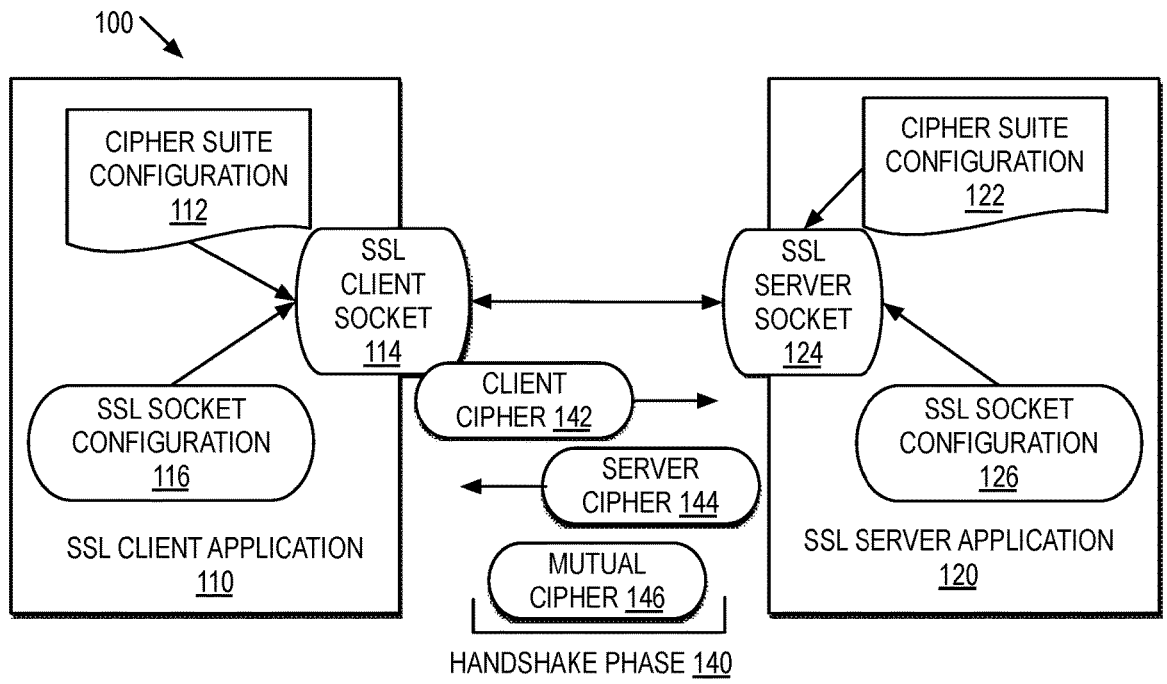
FIG. 1 illustrates one example of block diagram of a network environment for applications with local cipher suite configurations, without a centralized service for managing valid cipher suites.

FIG. 1 illustrates a block diagram of a network environment for applications with local cipher suite configurations, without a centralized service for managing valid cipher suites.

In one example, a network environment 100 includes an SSL client application 110 and an SSL server application 120. In one example, SSL is a computer networking protocol that manages server authentication, client authentication, and encrypted communication between SSL client application 110 and SSL server application 120. In one example, SSL may use a combination of public-key and symmetric-key encryption, based on the parameters of a selected cipher suite, to secure a connection between two machines over a network. In one example, SSL may run in a layer above the transmission control protocol/internet protocol (TCP/IP) layer, which manages the transport and routing of data over a network, such as the Internet or a private network. In one example, SSL may encrypt the data of network connections in an application layer. TLS is another security protocol that provides privacy and data integrity between two communication applications, such as SSL client application 110 and SSL server application 120, which require data to be securely exchanged over a network, such as file transfers VPN connections, instant messaging, and voice over IP. As described herein, references to SSL may refer to SSL, TLS or a combination of SSL/TLS.

In one example, when initiating a new secured session, an SSL client socket 114 is established for SSL client application 110 according to SSL socket configuration 116 and an SSL server socket 124 is established for SSL server application 120 according to SSL socket configuration 126. In one example, each of SSL client socket 114 and SSL server socket 124 may refer to an endpoint in communication flow between two programs running over a network, where data is passed back and forth between SSL client application 110 and SSL server application 120 via SSL client socket 114 and SSL server socket 124 in a network. In one example, each of SSL socket configuration 116 and SSL socket configuration 126 may include the attributes needed to control the behavior of client and server SSL endpoints. In one example, each SSL socket configuration may include unique names with specific management scopes, such as a cell, node group, node, server, cluster, or endpoint scope.

In one example, when a new secured session is initiated for SSL client application 110 and SSL server application 120, the SSL protocol may implement a first protocol, called a record protocol, that allows a client to authenticate a server for the session and a second protocol, called a handshake protocol, that allows the client and server to establish an encrypted SSL connection for the session. Following the handshake protocol, which may also be referred to as a handshake phase, the SSL client application 110 and SSL server application 120 mutually select a cipher suite and shared key to encrypt information exchanged during the session.

In particular, in one example, to allow users to select a level of security that meets their security needs, and to enable communications between different users who may have different security needs, SSL client socket 114 and SSL server socket 124 may mutually select a common cipher suite that both SSL client application 110 and SSL server application 120 have in common. In one example, if SSL client application 110 and SSL server application 120 do not have a cipher suite in common, then a secure communication channel may not be established between SSL client application 110 and SSL server application 120.

Different cipher suites may provide different levels of security. For example, some cipher suites may implement algorithms that provide high levels of security, but require a large amount of computation for encryption and decryption. For example, some cipher suites may implement algorithms that are less secure, but provide rapid encryption and decryption. In one example, the length of a key that is used for encryption by a cipher suite may impact the level of security, where a longer key may provide greater security for the data.

In one example, to facilitate selection of a cipher suite during an SSL handshake, in one example, SSL socket configuration 116 and SSL socket configuration 126 may each include an attribute identifying a selection of authorized cipher suites. For example, SSL socket configuration 116 may specify that SSL client socket 114 should access a selection of valid ciphers from a local or network level based cipher suite configuration 112 and SSL socket configuration 126 may specify that SSL server socket 124 should access a selection of valid ciphers from a local or network level based cipher suite configuration 122. In one example, each of cipher suite configuration 112 and cipher suite configuration 122 may specify the same sets of cipher suites or different sets of cipher suites available for securing communications.

In one example, during an SSL handshake, SSL client socket 114 and SSL server socket 124 may exchange information about which cipher suites are available to each, in order to mutually agree on a common cipher suite. In one example, during a handshake phase 140, as illustrated by client cipher 142, SSL client socket 114 may pass identifiers of client cipher suites from cipher suite configuration 112 to SSL server socket 124, where SSL server socket 124 may determine which received cipher suites in client cipher 142 match server cipher suites in cipher suite configuration 122 and may return one or more matching cipher suites in server cipher 144, for use in the secure connection between SSL client socket 114 and SSL server socket 124. SSL client socket 114 or SSL client socket 124 may select mutual cipher 146 from the matching cipher suites returned in server cipher 144. In another example, during a handshake phase 140, as illustrated by server cipher 144, SSL server socket 124 may pass identifiers of server cipher suites from cipher suite configuration 122 to SSL client socket 114, where SSL client socket 114 may determine which received cipher suites in server cipher 144 match client cipher suites in cipher suite configuration 112 and may return one or more matching cipher suites in client cipher 142, for use in the secure connection between SSL client socket 114 and SSL server socket 124. SSL client socket 114 or SSL client socket 124 may select mutual cipher 146 from the matching cipher suites returned in client cipher 142. In additional or alternate embodiments, additional or alternate steps may be included in handshake phase 140 for the selection of mutual cipher 146.

Malicious users may look for ways to exploit secure connections established with cipher suites with weaker security. Some cipher suites may become vulnerable from successful attacks by malicious users, where malicious users determine a method of accessing data that has been secured with a particular cipher suite. Network administrators, including but not limited to network security professionals and others who monitor or manage networks, may become aware of an attack by malicious users on a particular cipher suite, which exposes the vulnerabilities of the cipher suite. In one example, once a network administrator identifies a cipher suite vulnerability, the network administrator may publish the discovery of the vulnerability and a risk associated with the vulnerability in a document that other network administrators may access. For example, mitre.org manages a published list of Common Vulnerabilities and Exposures (CVEs) with a log of discovered vulnerabilities of cipher suites recorded using a set of formatting rules specified by the organization.

In one example, when a particular cipher suite is discovered as vulnerable after an attack, depending on the security requirements for a particular application, a network administrator may determine that discovered vulnerabilities indicate a particular cipher suite is too risky for users within an organization's network to implement applications that use the particular cipher suite. However, when a network administrator does determine that a particular cipher suite is too risky for users, if SSL socket configuration 116 is set to a selection of valid cipher suites in cipher suite configuration 112, which is managed at a local application or network level, and SSL socket configuration 126 is set to a selection of valid cipher suites in cipher suite configuration 122, which is managed at a local application or network level, the network administrators of the networks in which each of SSL client application 110 and SSL server application 120 run may not have visibility as to which applications used within each organization's network include the vulnerable cipher suite within the local or network cipher suite configuration or may not have visibility into which applications currently have sessions open that use the vulnerable cipher suite. In addition, each organization's network may have many applications on many servers with many sessions open that use the vulnerable cipher suite and if monitored at the network level, may require a network administrator to reprogram one or more layers on each server to remove the vulnerable cipher suite, which requires additional time, leaving the servers open for exploitation through the vulnerable cipher suite.

Figure 2:
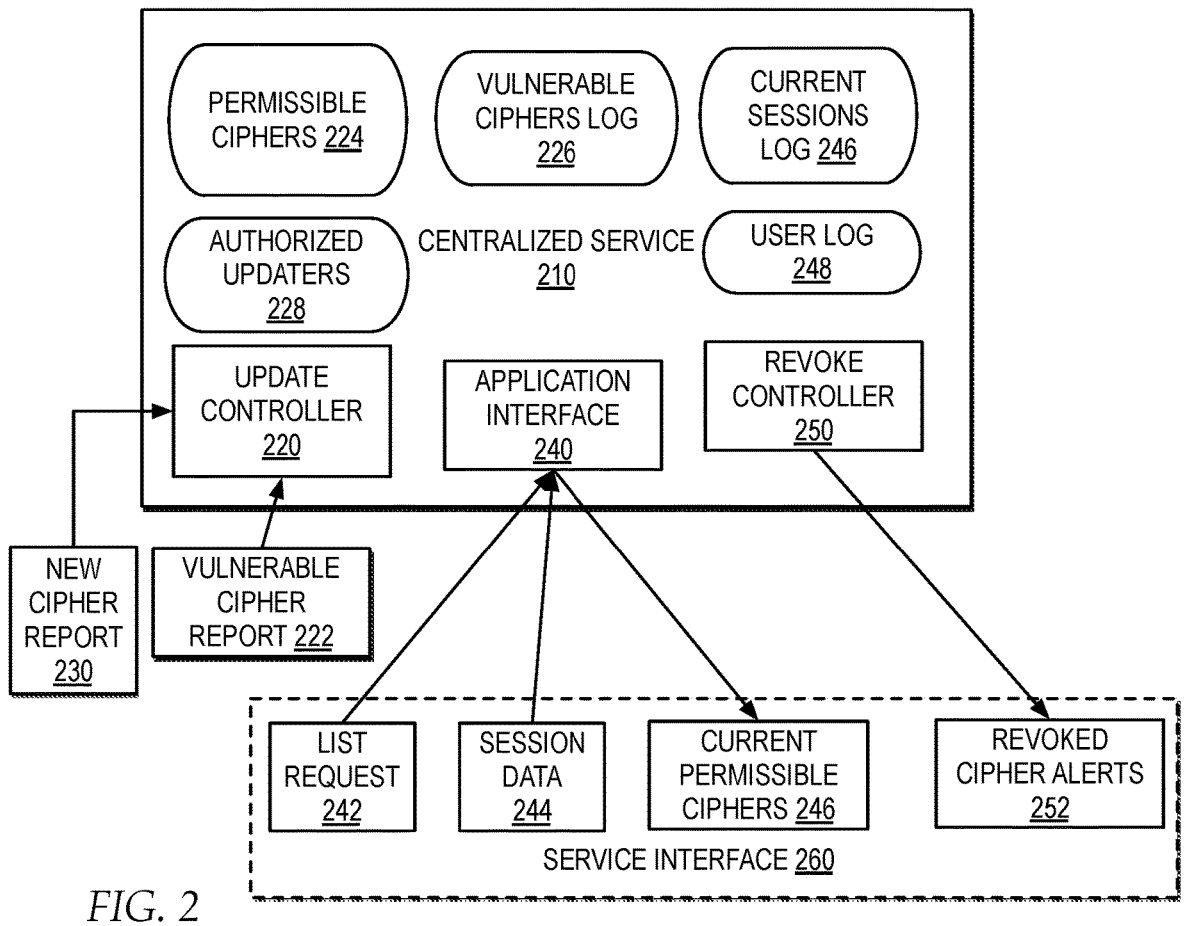
FIG. 2 illustrates one example of a block diagram of a centralized service for managing valid cipher suites for use in secure connections across multiple applications.

FIG. 2 illustrates a block diagram of a centralized service for managing valid cipher suites for use in secure connections across multiple applications.

In one example, a centralized service 210 manages a list of permissible ciphers 224 for use by one or more SSL applications when an SSL handshake is being performed to dynamically manage a selection of valid cipher suites passed by each of the SSL applications. In one example, permissible ciphers 224 may include identifiers for one or more cipher suites that have not been indicated as vulnerable or that may have indicators of vulnerability, but have a level of risk below a particular threshold.

In one example, centralized service 210 may include an update controller 220 for managing entries in permissible ciphers 224. Update controller 220 may receive a vulnerable cipher report 222 from one or more sources, where vulnerable cipher report 222 indicates a discovery of a vulnerability of a particular cipher suite and any risks associated with the vulnerability. Update controller 220 may determine whether a discovery of a vulnerability of a particular cipher suite and any risks associated with the vulnerability indicate that the cipher suite should be removed from permissible ciphers 224. In one example, if update controller 220 removes a particular cipher suite from permissible ciphers 224, update controller 220 may also update a vulnerable ciphers log 226 with a record of the time and date of vulnerable cipher report 222, the cipher suite removed and any risks associated with the cipher suite.

In another example, update controller 220 may receive a new cipher report 230 from one or more sources, where new cipher report 230 specifies a new cipher suite to add to permissible ciphers 224. In one example, update controller 220 may verify that the source of new cipher report 230 is authorized to add a new cipher suite to permissible ciphers 224, and in response to determining the source is authorized, update permissible ciphers 224 with the new cipher suite identified in new cipher report 230. In one example, as new cipher suites are developed and determined to meet the security requirements for an organization's network, a network administrator may send new cipher report 230 to update controller 220, to effectively update the cipher suites available to all the SSL applications that subscribe to centralized service 210 without the network administrator needing to individually update each SSL application with the new cipher suite.

In one example, vulnerable cipher report 222 may represent a report published in one or more formats, such as, but not limited to, a pdf format, a .xml format, and a table format. In one example, update controller 220 may include a filter that reads the data in vulnerable cipher report 222, compares vulnerable cipher report 222 with a previously received report, and determines which entries in vulnerable cipher report 222 are new or updated. In one example, update controller 220 may also include a filter enabled to interpret data reported in vulnerable cipher report 222 to determine which cipher suites are identified and any risk identified with each cipher suite. In another example, an administrator may specify vulnerable cipher report 222 with one or more cipher suite identifiers and risks associated with each cipher suite identifier.

In one example, centralized service 210 may maintain a list of one or more users or services that are authorized to provide vulnerable cipher report 222, as authorized updaters 228. In one example, update controller 220 may only read vulnerable cipher report 222 if received from a user included in authorized updaters 228. In another example, update controller 220 may pull vulnerable cipher report 222 from a service identified in authorized updaters 228, where authorized updaters 228 may include services that publish information discovered about cipher suite vulnerabilities and that are subscribed to by centralized service 210.

In one example, centralized service 210 includes an application interface 240 through which applications, such as SSL client application 110 and SSL server application 120 may interface. In one example, an SSL application may implement a service interface 260, through which the SSL application interfaces with application interface 240 of centralized service. In one example, centralized service 210 is implemented as a service in a centrally hosted environment in which centralized service 210 is accessible to one or more of SSL client application 110 and SSL server application 120 via a network connection, but centralized service 210 is not implemented within SSL client application 110 or SSL server application 120 and is not implemented within a gateway or firewall accessible to SSL client application 110 or SSL server application 120. For example, centralized service 210 may be implemented as a service in a hosted environment for one or more subscribers registered in a user log 248, where the hosted environment is centrally hosted for access by multiple subscribers in multiple private network environments, such as a hosted environment in a cloud computing environment. For example, centralized service 210 may be implemented under a Software as a Service model from a cloud provider. In another example, centralized service 210 may be provided by an application service provider or on demand service provider.

In one example, SSL client application 110 and SSL server application 120 may each implement a separate instance of service interface 260 that separately sends list request 242 to application interface 240, requesting a current list of permissible ciphers. In one example, application interface 240 may receive list request 242 from an application, verify that service interface 260 of the requesting application is a subscriber in user log 248, access permissible ciphers 224, and return permissible ciphers 224 as current permissible ciphers 246 to service interface 260. In another example, centralized service 210 may push current permissible ciphers 246 to service interface 260, according to a service schedule specified in user log 248. As service interface 260 receives current permissible ciphers 246, applications requesting current permissible ciphers 246 may lookup and share the ciphers in current permissible ciphers 246 during the SSL/TLS handshake phase, separate from or in lieu of any cipher suite configuration for an application. As a result, if permissible ciphers 224 is updated to remove a cipher suite identified in vulnerable cipher report 222 as vulnerable, new sessions initiated by applications receiving current permissible ciphers 246, without the removed cipher suite, will not use the removed cipher suite.

In one example, service interface 260 may send session data 244 to application interface 240, where session data 244 includes identifiers of one or more sockets established for a secure session and the cipher suite selected for the secure session. Application interface 240 may update a current session log 246 with the identifiers for sockets and cipher suite selection from session data 244.

In one example, as update controller 220 updates vulnerable ciphers log 226 with vulnerable cipher suites, a revoke controller 250 may be triggered to revoke the cipher suite for one or more current session identified in current sessions log 246. In one example, in response to an update by update controller 220 to vulnerable ciphers log 226, revoke controller 250 may identify a selection of one or more open sessions in current sessions log 246 that implement the revoked cipher suite, identify where to direct subscriber communications for each of the selection of open sessions from communication directives in user log 248 from among applications and network administrators, and send alert messages to the selected service interfaces of applications and network administrators for applications with open sessions currently using the revoked cipher suite, as revoked cipher alerts 252. In one example, service interface 260 of an application may receive revoked cipher alerts 252 and automatically close the secure connection on the application.

Figure 3:
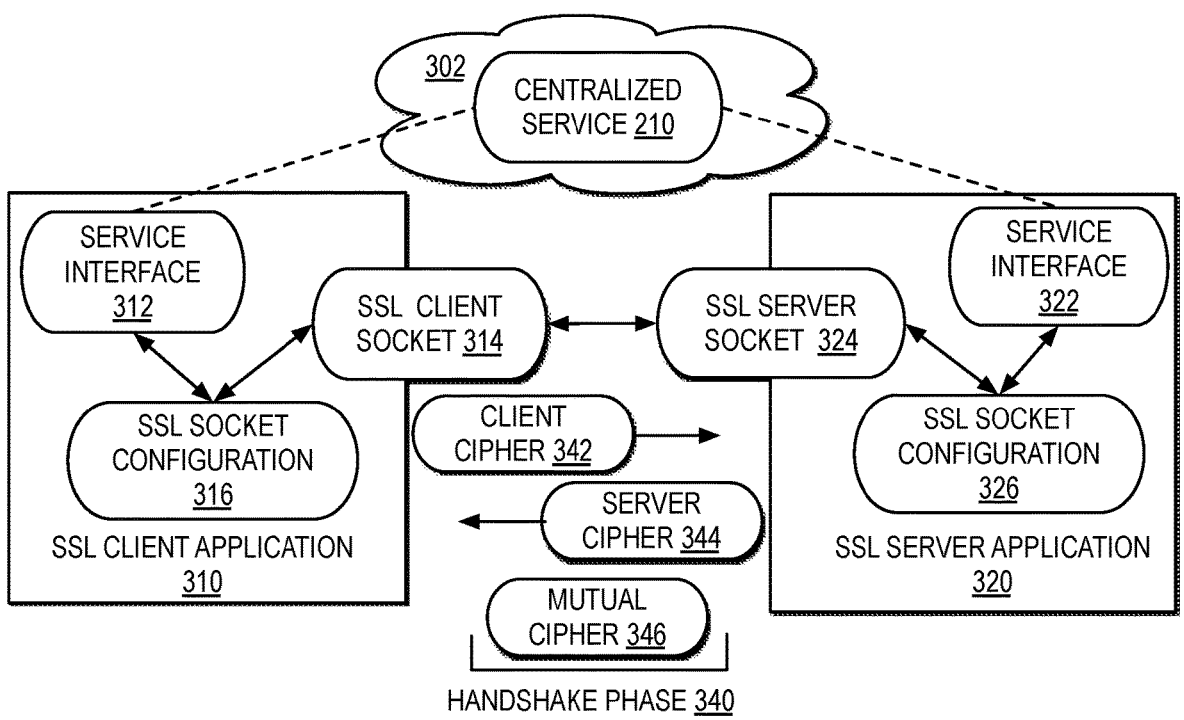
FIG. 3 illustrates one example of a block diagram of a centralized service for managing valid cipher suites for use in secure connections across multiple applications with service interfaces integrated with SSL socket configurations.

FIG. 3 illustrates a block diagram of a centralized service for managing valid cipher suites for use in secure connections across multiple applications with service interfaces integrated with SSL socket configurations.

In one example, centralized service 210 is accessible in a centrally hosted network 302. In one example, an SSL client application 310 may load an SSL socket configuration 316 and an SSL server application 320 may load an SSL socket configuration 326. SSL client application 310 may initiate an SSL client socket 314, based on SSL socket configuration 316, and SSL server application 320 may initiate an SSL server socket 324, based on SSL socket configuration 326.

In one example, an attribute of SSL socket configuration 316 specifying the selection of valid cipher suites may be set to access a service interface 312 and an attribute of SSL socket configuration 326 specifying the selection of valid cipher suites may be set to access a service interface 322. In one example, service interface 312 may be integrated within SSL client application 310 or called by SSL client application 310. In addition, in one example, service interface 322 may be integrated within SSL server application 320 or called by SSL server application 320.

In one example, when a SSL handshake phase 340 is triggered, overriding any local cipher suite configuration set for an application, SSL socket configuration 316 may alert service interface 312 that the SSL handshake is triggered. Service interface 312 may send list request 242 to centralized service 210 and receive current permissible ciphers 252 from centralized service 210. SSL socket configuration 316 may specify the authorized cipher suites for SSL client socket client to pass to SSL server socket 324 as client cipher 342 during handshake phase 340 from current permissible ciphers 252 returned from centralized service 210.

In addition, in one example, when SSL handshake phase 340 is triggered, overriding any local cipher suite configuration set for an application, SSL socket configuration 326 may alert service interface 322 that the SSL handshake is triggered. Service interface 322 may send list request 242 to centralized service 210 and receive current permissible ciphers 252 from centralized service 210. SSL socket configuration 326 may specify the authorized cipher suites for SSL server socket 324 to pass to SSL client socket 314 as server cipher 344 during handshake phase 340 from current permissible ciphers 252 returned from centralized service 210.

In one example, SSL client socket 314 and SSL server socket 324 may select mutual cipher 346 from among one or more matching cipher suites allowed in current permissible ciphers 246 as passed by centralized service 210 to each of service interface 312 and service interface 322. Since centralized service 210 actively monitors for vulnerable ciphers, centralized service 210 removes any ciphers suites found to be vulnerable and only delivers valid cipher suites in current permissible ciphers.

In one example, in response to establishing the secure connection between SSL client socket 314 and SSL server socket 324 based on mutual cipher 346, each of service interface 312 and service interface 322 may separately send session data 244 to centralized service 210 with information about SSL client socket 314, SSL server socket 324, and mutual cipher 346. In one example, by each of service interface 312 and service interface 322 registering information about the current session with centralized service 210, centralized service 210 may then track whether mutual cipher 346 is removed from permissible ciphers 224, and in response to update controller removing mutual cipher 346 from permissible ciphers 224, revoke controller 250 may send separate revoked cipher alerts 252 specifically to service interface 312 and service interface 322 to trigger each of the SSL client socket 314 and SSL server socket 324 to close the secure communication.

In one example, by configuring service interface 312 and service interface 322 within SSL socket configuration 316 and SSL socket configuration 326, for a network administrator to establish a service interface as the interface for SSL sockets for an SSL client application or an SSL server application, the network administrator only needs to update the SSL socket configuration for the SSL application to direct to a service interface that facilitates a subscription to centralized service 210. Network administrators may rely on centralized service 210 to centrally maintain a valid list of permissible ciphers for new sessions by subscribing SSL sockets and to monitor current SSL sessions and provide updates to the SSL sockets if a mutual cipher suite selected for a current SSL session is revoked. While in the example illustrated, the SSL socket configuration for both SSL client application 310 and SSL server application 320 has been specified to a separate service interface for accessing centralized service 210, in additional or alternate examples, only one of SSL client application 310 and SSL server application 320 may include an SSL socket configuration specified to a service interface for accessing centralized service 210. Each of SSL client application 310 and SSL server application 320 may separately determine that mutual cipher 346 is vulnerable and select to terminate a current secure connection.

Figure 4:
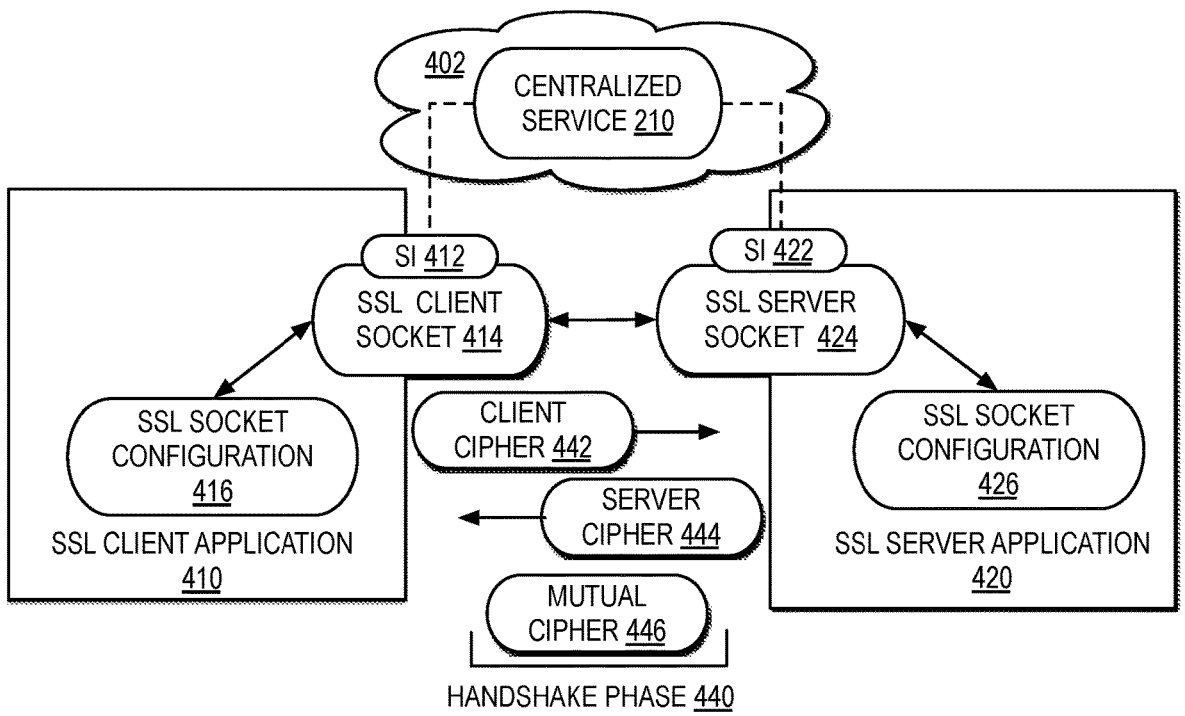
FIG. 4 illustrates one example of a block diagram of a centralized service for managing valid cipher suites for use in secure connections across multiple applications with service interfaces integrated for ad-hoc dynamic monitoring of allowable cipher suites from a centralized service by SSL client sockets and SSL server sockets.

FIG. 4 illustrates a block diagram of a centralized service for managing valid cipher suites for use in secure connections across multiple applications with service interfaces integrated for ad-hoc dynamic monitoring of allowable cipher suites from a centralized service by SSL client sockets and SSL server sockets.

In one example, centralized service 210 is accessible in a centrally hosted network 402. In one example, an SSL client application 410 may load an SSL socket configuration 416 and an SSL server application 420 may load an SSL socket configuration 426. SSL client application 410 may initiate an SSL client socket 414, based on SSL socket configuration 416, and SSL server application 420 may initiate an SSL server socket 424, based on SSL socket configuration 426.

In one example, an attribute of SSL socket configuration 416 specifying the selection of valid cipher suites may be set to enable SSL client socket 414 to be created with a service interface (SI) 412 that effectively supports an ad hoc network connection between SSL client socket 414 and centralized service 210. In one example, SSL socket configurations 416 may include specifications for centralized service 210 to enable SSL client socket 414 to establish a self-configuring, dynamic connection to centralized service 210 as SSL client socket 414 is opened.

In one example, an attribute of SSL socket configuration 426 specifying the selection of valid cipher suites may be set to enable SSL server socket 424 to be created with a service interface (SI) 422 that effectively supports an ad hoc network connection between SSL server socket 424 and centralized service 210. In one example, SSL socket configurations 426 may include specifications for centralized service 210 to enable SSL server socket 424 to establish a self-configuring, dynamic connection to centralized service 210 as SSL server socket 424 is opened.

In one example, when a SSL handshake phase 440 is triggered, service interface 412 may send list request 242 to centralized service 210 and receive current permissible ciphers 252 from centralized service 210. SSL client socket 414 may pass the cipher suites specified in current permissible ciphers 246 to SSL server socket 424 as client cipher 442 during handshake phase 440. In addition, when a SSL handshake phase 440 is triggered, service interface 422 may send list request 242 to centralized service 210 and receive current permissible ciphers 246 from centralized service 210. SSL server socket 424 may pass the cipher suites specified in current permissible ciphers 246 to SSL client socket 414 as server cipher 444 during handshake phase 440.

In one example, SSL client socket 414 and SSL server socket 424 may select mutual cipher 446 from among one or more matching cipher suites allowed in current permissible ciphers 246 as passed by centralized service 210 to each of service interface 412 and service interface 422. Since centralized service 210 actively monitors for vulnerable ciphers, centralized service 210 removes any ciphers suites found to be vulnerable and only delivers valid cipher suites in current permissible ciphers.

In one example, in response to establishing the secure connection between SSL client socket 414 and SSL server socket 424 based on mutual cipher 446, each of service interface 412 and service interface 422 may separately send session data 244 to centralized service 210 with information about SSL client socket 414, SSL server socket 424, and mutual cipher 446. In one example, by each of service interface 412 and service interface 422 registering information about the current session with centralized service 210, centralized service 210 may then track whether mutual cipher 446 is removed from permissible ciphers 224, and in response to update controller removing mutual cipher 446 from permissible ciphers 224, revoke controller 250 may send separate revoked cipher alerts 252 specifically to service interface 412 and service interface 422 to trigger each of the SSL client socket 414 and SSL server socket 424 to close the secure communication.

In one example, by configuring SSL socket configuration 416 and SSL socket configuration 426 to separately enable an ad hoc creation of a network connection for each of SSL client socket 414 and SSL server socket 424 to centralized service 210, the network administrator only needs to update the SSL socket configuration for the SSL application to direct to a service interface that facilitates a subscription to centralized service 210. While in the example illustrated, the SSL socket configuration for both SSL client application 410 and SSL server application 420 has been specified for ad hoc creation of a network connection from a socket to access centralized service 210, in additional or alternate examples, only one of SSL client application 410 and SSL server application 420 may include an SSL socket configuration specified for ad hoc creation of a network connection from a socket to access centralized service 210. Each of SSL client application 410 and SSL server application 420 may separately determine that mutual cipher 446 is vulnerable and select to terminate a current secure connection.

Figure 5:
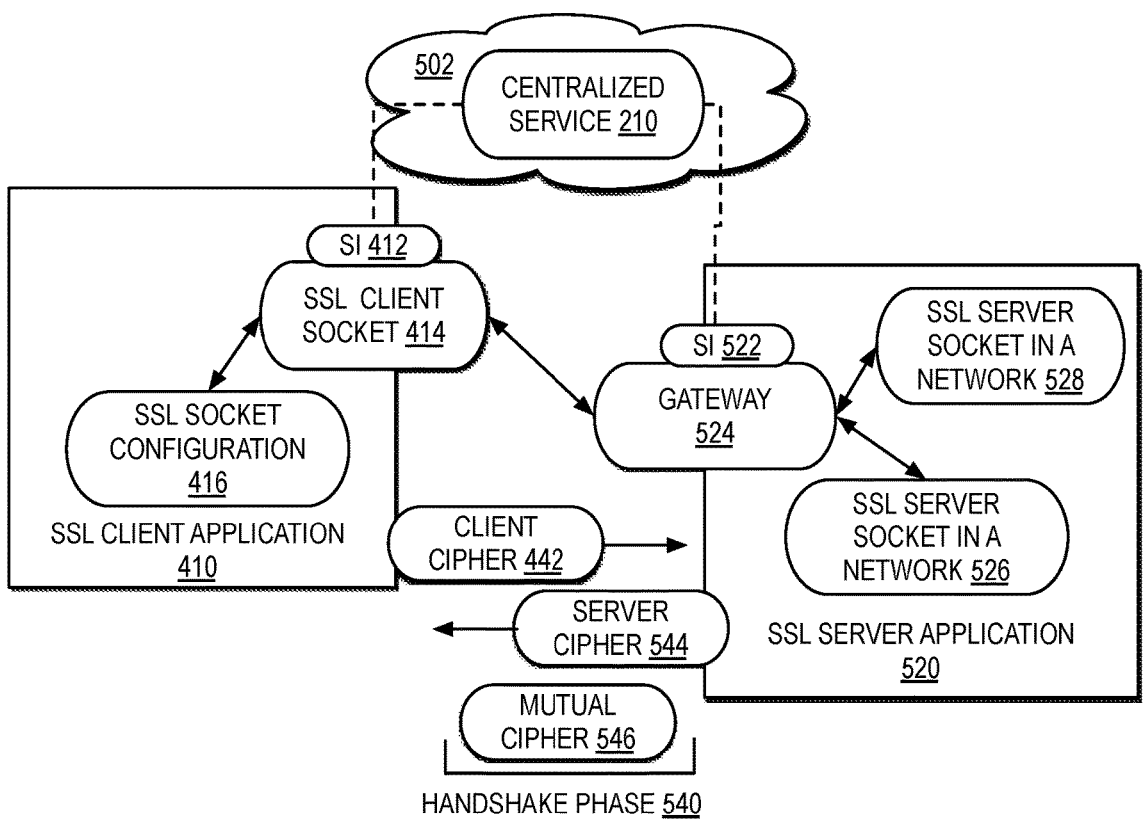
FIG. 5 illustrates one example of a block diagram of a centralized service for managing valid cipher suites for use in secure connections across multiple applications with a service interface integrated for ad-hoc dynamic monitoring of allowable cipher suites from a centralized service by SSL client sockets and with a service interface integrated into a gateway for dynamic monitoring of allowable cipher suites for multiple SSL server sockets in a network.

FIG. 5 illustrates a block diagram of a centralized service for managing valid cipher suites for use in secure connections across multiple applications with a service interface integrated for ad-hoc dynamic monitoring of allowable cipher suites from a centralized service by SSL client sockets and with a service interface integrated into a gateway for dynamic monitoring of allowable cipher suites for multiple SSL server sockets in a network.

In one example, centralized service 210 is accessible in a centrally hosted network 502. In one example, as described in FIG. 4, SSL client application 410 may load an SSL socket configuration 416 and SSL client application 410 may initiate an SSL client socket 414, based on SSL socket configuration 416.

In one example, a gateway 524 configured for interfacing with multiple SSL server sockets in a network, for an SSL server application 520, is specified with a service interface (SI) 522. In one example, gateway may interface with an SSL server in a network 526 and an SSL server in a network 528. In one example, gateway 524 may include networking hardware that provides a network node for interfacing with another network that uses different protocols. In one example, gateway 524 may also act as a proxy server or a firewall server.

In one example, when gateway 524 detects that an SSL handshake phase 540 is triggered for SSL server socket in a network 526 or SSL server socket in a network 528, service interface 522 may send list request 242 to centralized service 210 and receive current permissible ciphers 246 from centralized service 210. In one example, gateway 524 may pass current permissible ciphers 246 to SSL server socket in a network 526 or SSL server socket in a network 528 and the SSL server socket may specify server cipher 544 sent during the handshake phase with current permissible ciphers 246. In another example, gateway 524 may insert current permissible ciphers 246 into server cipher 544 before passing server cipher 544 to SSL client socket 414.

In one example, SSL client socket 414 and gateway 524 may select mutual cipher 546 from among one or more matching cipher suites allowed in current permissible ciphers 246 as passed by centralized service 210 to each of service interface 412 and service interface 522. Since centralized service 210 actively monitors for vulnerable ciphers, centralized service 210 removes any ciphers suites found to be vulnerable and only delivers valid cipher suites in current permissible ciphers.

In one example, in response to establishing the secure connection between SSL client socket 414 and either of SSL server socket in a network 526 or SSL server socket in a network 528 through gateway 524, service interface 412 and service interface 522 may separately send session data 244 to centralized service 210 with information about SSL client socket 414, gateway 524, and mutual cipher 546. In one example, by each of service interface 412 and service interface 522 registering information about the current session with centralized service 210, centralized service 210 may then track whether mutual cipher 546 is removed from permissible ciphers 224, and in response to update controller removing mutual cipher 546 from permissible ciphers 224, revoke controller 250 may send separate revoked cipher alerts 252 specifically to service interface 412 and service interface 522 to trigger each of the SSL client socket 414 and gateway 524 to close the secure communication. In one example, gateway 524, upon receipt of a revoked cipher alerts 252 may selectively close multiple current sessions opened through gateway 524 that use the revoked cipher suite.

In one example, while gateway 524 may be configured with service interface 522 for dynamically managing a current list of valid cipher suites, the list of valid cipher suites, managed as permissible ciphers 224, is managed by centralized service 210 and pushed to gateway 524 on demand, or as a scheduled service, such that a network administrator only needs to configure gateway 524 to access centralized service 210, and centralized service 210 then dynamically manages current permissible ciphers 246 sent to gateway 524, but the network administrator does not need to configure gateway 524 with specific cipher suites, which may be later found to be vulnerable, and require reprogramming.

Figure 6:
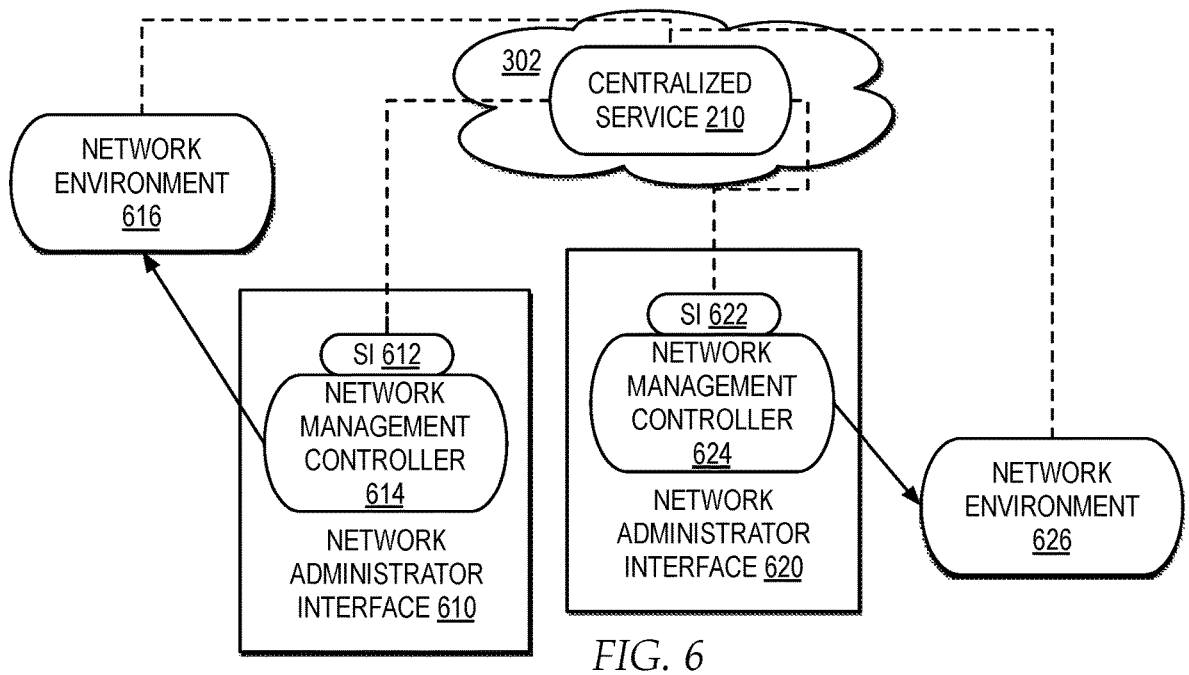
FIG. 6 illustrates one example of a block diagram of a centralized service for automatically providing alerts and risk information for network administrators as centralized service manages revoking cipher suites for current session.

FIG. 6 illustrates a block diagram of a centralized service for automatically providing alerts and risk information for network administrators as centralized service manages revoking cipher suites for current session.

In one example, network administrators that monitor networks for organization, where the networks may include one or more SSL applications, may subscribe to centralized service 210 for the one or more SSL applications. In one example, each network administrator may manage a network through a network administrator interface, such as a network administrator interface 610 and a network administrator interface 620. In one example, each network administrator interface may include a network management controller for managing one or more SSL applications in a network environment, such as network management controller 614 for a network environment 616 and network management controller 624 for a network environment 626 for managing one or more SSL applications in a network.

In one example, each of network environment 616 and network environment 626 may include one or more service interfaces for connecting SSL applications with centralized service 210. In addition, network management controller 614 may include a service interface 612 and network management controller 624 may include a service interface 622. Service interface 612 and service interface 622 may be specified, by network environment, to enable centralized service 210 to deliver revoked cipher alerts 252 to network administrators when sessions open within each network environment managed by each network administrator receive revoked cipher alerts 252.

In one example, session data 244 passed by service interfaces to centralized service 210 when a new session is established, in addition to include information about the client socket, server socket, and mutual cipher selected, may also designate a subscription identifier for a particular network environment. In one example, when revoke controller 250 determines that there are sessions open in current sessions log 246 that use a newly revoked cipher suite, revoke controller 250 may distribute revoked cipher alerts 252 to the service interfaces at the socket level, but may also distribute revoked cipher alerts 252 to the service interfaces at the network administrator level. For example, if centralized service 210 detects a session in network environment 616 is using a cipher suite that is newly revoked, centralized service 210 may send revoked cipher alerts 252 to the session in network environment 616 and to service interface 612. For example, if centralized service 210 detects a session in network environment 626 is using a cipher suite that is newly revoked, centralized service 210 may send revoked cipher alerts 252 to the session in network environment 626 and to service interface 622.

Service interface 612 and service interface 622 may integrate revoked cipher alerts 252 into one or more types of output interfaces of network administrator interface 610 and network administrator interface 612. For example, as service interface 612 and service interface 622 receive revoked cipher alerts 252, each of the service interfaces may be configured to output revoked cipher alerts in different ways. Revoked cipher alerts 252 may include information about a revoked cipher suite and the risks of the revoked cipher suite. A network administrator may select to categorize the types of risks that should be output as critical risks, such as risks that may need to automatically trigger shutting down the physical hardware of particular portions of a network environment versus the types of risks that should be output a less critical risks, such as risks that may need to be output in a display interface and prompt a selection of actions by a network administrator, but not require shutting down the physical hardware to a network environment.

In one example, revoked cipher alerts 252 distributed by centralized service 210 to service interface 612 and service interface 622 may generically specify the type of cipher suite that was revoked and the risks of the cipher suite. In addition, revoked cipher alerts 252 distributed to service interface 612 and service interface 622 may specify the specific sockets that were impacted, the number of sockets for a particular subscription that were impacted, and other information that may indicate the degree of exposure that a network environment may have experienced due to a vulnerable cipher suite.

In the example, by centralized service 210 monitoring for vulnerable cipher suites and distributing revoked cipher alerts 252 to open sessions within network environments, when network administrators also receive revoked cipher alerts 252, the network administrators may focus on actions that need to be taken to mediate risks to the higher level network infrastructure, rather than focusing on closing individual open sessions, relying on centralized service 210 to distribute revoked cipher alerts 252 to trigger sockets to close secured channels that were opened with a revoked cipher suite.

Figure 7:
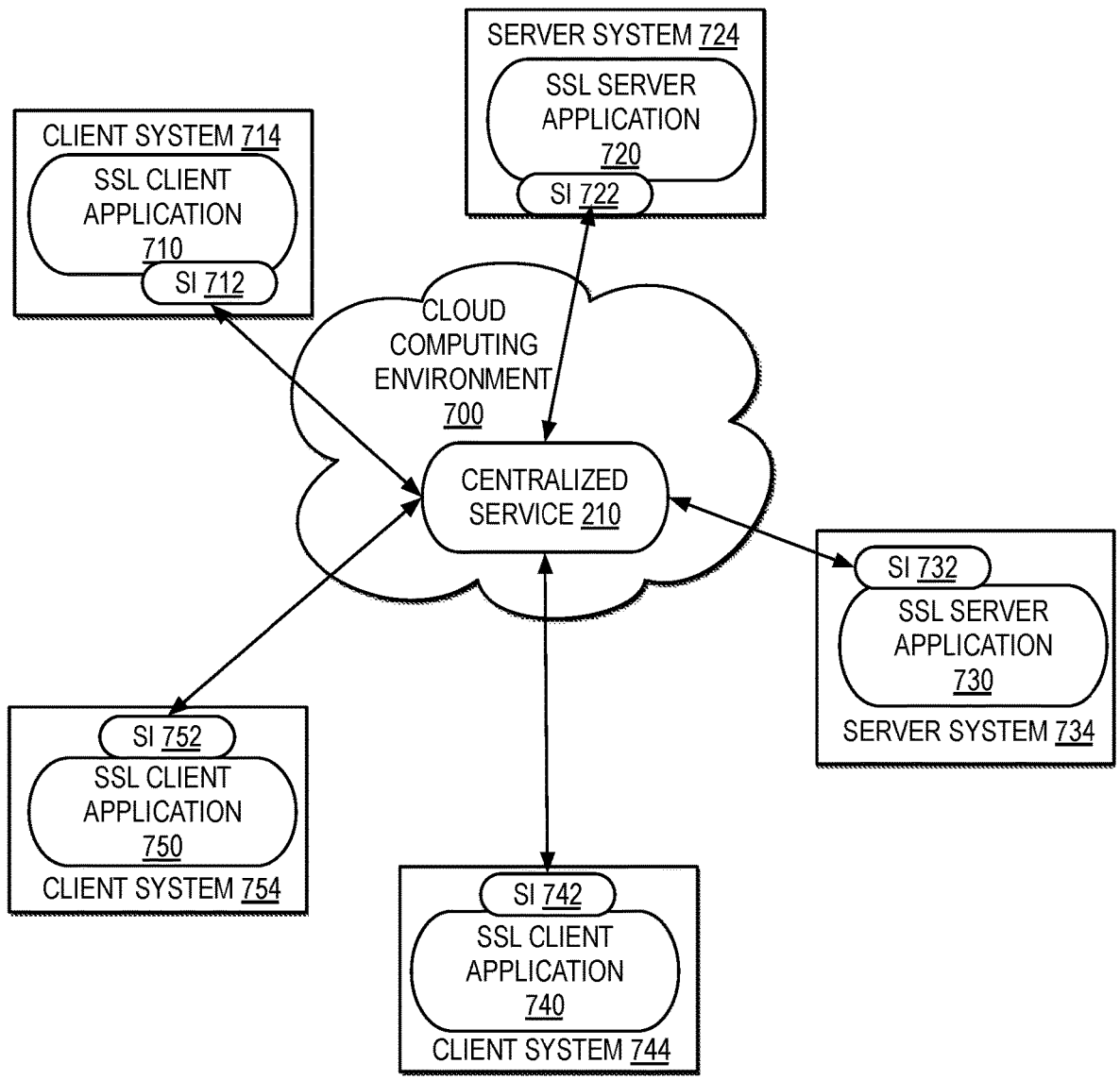
FIG. 7 illustrates one example a block diagram of a cloud environment for hosting a centralized service accessed by multiple client systems hosting SSL client applications and multiple server systems hosting SSL server applications.

FIG. 7 illustrates a block diagram of one example of a cloud environment for hosting a centralized service accessed by multiple client systems hosting SSL client applications and multiple server systems hosting SSL server applications.

In one example, cloud computing is a model of service delivery for enabling convenient, on-demand network access to a shared pool of configurable computing resources (e.g. networks, network bandwidth, servers, processing, memory, storage applications, virtual machines, and services) that can be rapidly provisioned and released with minimal management effort or interaction with a provider of the service. This cloud model may include one or more characteristics, one or more service models, and one or more deployment models.

For example, characteristics may include, but are not limited to, on-demand self-service, broad network access, resource pooling, rapid elasticity, and measured service. In one example, on-demand self-service may include a service in which a cloud consumer can unilaterally provision computing capabilities, such as server time and network storage, as needed automatically without requiring human interaction with the service's provider. In one example, broad network access may include capabilities that are available over a network and accessed through standard mechanisms that promote use by heterogeneous thin or thick client platforms (e.g., mobile phones, laptops, and PDAs). In one example, resource pooling may include an environment in which the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In one example, rapid elasticity may include capabilities that may be rapidly and elastically provisioned, in some cases automatically, to quickly scale out and rapidly released to quickly scale in. To the consumer, the capabilities available for provisioning often appear to be unlimited and can be purchased in any quantity at any time. In one example, measured service may include support for cloud systems to automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

In one example, the one or more service models may include, but are not limited to, Software as a Service (SaaS), Platform as a Service (PaaS), and Infrastructure as a Service (IaaS). In one example, software as a Service (SaaS) may include a capability provided to the consumer to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In one example, platform as a Service (PaaS) may include the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In one example, infrastructure as a Service (IaaS) may include the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

In one example, the one or more deployment Models may include, but are not limited to, private cloud, community cloud, public cloud, and hybrid cloud. In one example, private cloud may include a cloud in which the cloud infrastructure is operated solely for an organization. It may be managed by the organization or a third party and may exist on-premises or off-premises. In one example, a community cloud may include the cloud infrastructure that is shared by several organizations and supports a specific community that has shared concerns (e.g., mission, security requirements, policy, and compliance considerations). The community cloud may be managed by the organizations or a third party and may exist on-premises or off-premises. In one example, a public cloud may include cloud infrastructure that is made available to the general public or a large industry group and is owned by an organization selling cloud services. In one example, a hybrid cloud may include cloud infrastructure that is a composition of two or more clouds (private, community, or public) that remain unique entities but are bound together by standardized or proprietary technology that enables data and application portability (e.g., cloud bursting for load-balancing between clouds).

In one example, a cloud computing environment is service oriented with a focus on statelessness, low coupling, modularity, and semantic interoperability. At the heart of cloud computing is an infrastructure comprising a network of interconnected nodes.

Figure 8:
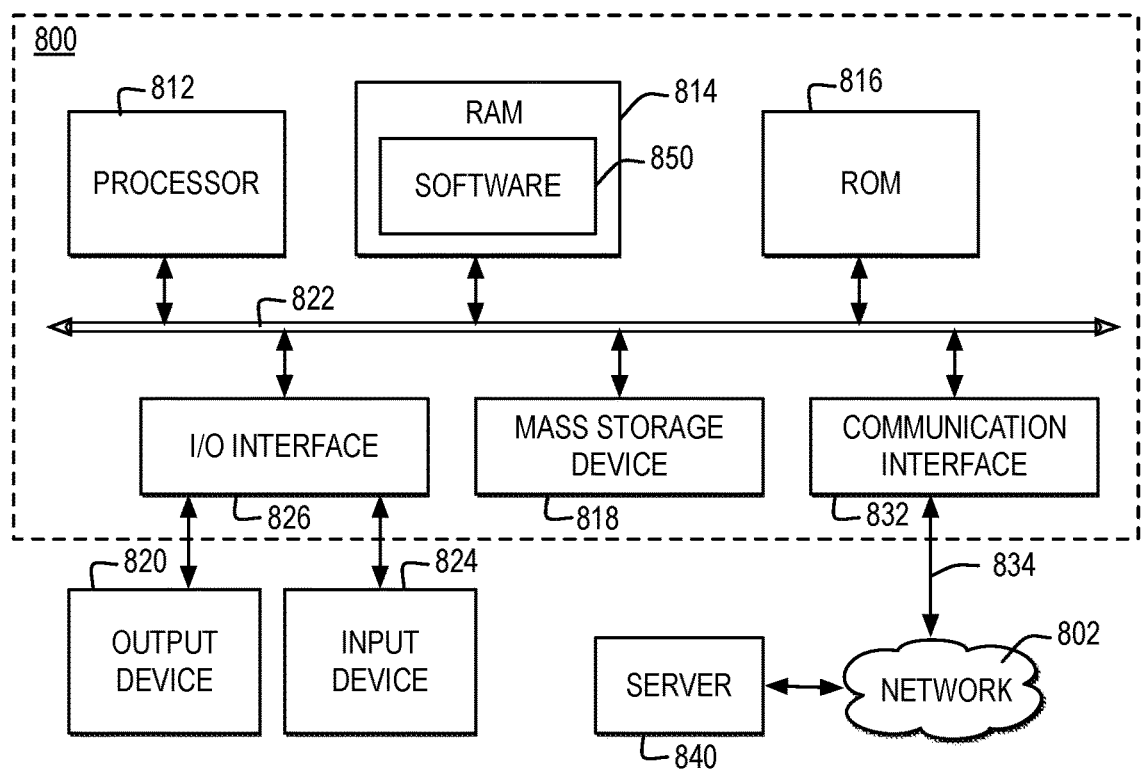
FIG. 8 illustrates one example of a block diagram of a computer system in which one embodiment of the invention may be implemented.

In one example, a cloud computing environment 700 may include one or more nodes, with which computing devices used by cloud consumers may communicate. In one example, the computer system illustrated in FIG. 8 is one example of a node. In another example, additional or alternate types of computing systems may be implemented as a node. In one example, the one or more nodes within cloud computing environment 700 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the type of computing device shown in FIG. 8 is intended to be illustrative only and that the computing nodes within cloud computing environment 700 can communicate with any type of computerized device over any type of network and/or network addressable connection (e.g., using a web browser).

In one example, cloud computing environment 700 may include or more functional abstraction layers, supported by the one or more nodes. For example, cloud computing environment 700 may include a hardware and software layer with hardware and software components, a virtualization layer that provides an abstraction layer from which virtual servers, virtual storage, virtual networks, virtual applications and operating systems, and virtual clients, may be provided. A management layer may provide resource provisioning, which provides dynamic procurement of computing resources and other resources that are utilized to perform tasks within the cloud computing environment. The management layer may provide metering and pricing, which provide cost tracking as resources are utilized within the cloud computing environment, and billing or invoicing for consumption of these resources. The management layer may provide security, which provides identity verification for cloud consumers and tasks, as well as protection for data and other resources. The management layer may provide a user portal that provides access to the cloud computing environment for consumers and system administrators. The management layer may provide service level management that provides cloud computing resource allocation and management such that required service levels are met. The management layer may provide service Level Agreement (SLA) planning and fulfillment to provide pre-arrangement for, and procurement of, cloud computing resources for which a future requirement is anticipated in accordance with an SLA.

In addition, the layers may include a workload layer that provides the functionality of centralized service 210. In one example, multiple client systems hosting one or more instances of SSL client applications may access centralized service 210. For example, a client system 714 may host an SSL client application 710 that accesses centralized service 210 via an SI 712, a client system 754 may host an SSL client application 750 that accesses centralized service 210 via an SI 752, and a client system 744 may host an SSL client application 740 that accesses centralized service 210 via an SI 742. In one example, a server system 724 may host an SSL server application 720 that accesses centralized service 210 via an SI 722 and a server system 734 may host an SSL client application 730 that accesses centralized service 210 via an SI 732.

In one example, by hosting centralized service 210 in cloud computing environment 700, multiple clients and servers may subscribe to centralized service 210, which provides a service for managing valid cipher suites for use in secure connections across multiple applications with one or more configurations of service interfaces, such as the configurations illustrated in FIGS. 3, 4, 5, and 6, independent of any particular private or public network hosting each of the clients and servers accessing centralized service 210. For example, SSL client application 750 may initiate SI 752 on an SSL client socket, while SSL client application 740 may initiate SI 742 from an SSL socket configuration.

In addition, in one example, by hosting centralized service 210 in cloud computing environment 700, a network administrator may subscribe to centralized service 210 for multiple instances of an SSL client application, where centralized service 210 then both monitors for ciphers that are invalid and automatically revokes invalidated ciphers at any of the subscribing SSL client applications that have a current secure connection established with the invalid cipher. For example, an administrator may subscribe to centralized service 210 for SSL client application 710 and SSL client application 750. Another administrator may subscribe to centralized service for SSL client application 740. In one example, centralized service 210 detects when each of SSL client application 710, SSL client application 740 and SSL client application 750 initiate secure connections with SSL server applications, and pushes a list of current permissible ciphers to each of the SSL client applications. In one example, SSL client application 710 and SSL client application 740 may each establish a secure connection with SSL server application 720 using a first cipher suite and SSL client application 750 may establish a secure connection with SSL server application 730 with a second cipher suite. In one example, in response to centralized service 210 detecting the first cipher suite is compromised and invalid, centralized service 210 may manage sending revoked cipher alerts to both SSL client application 710 and SSL client application 740, to efficiently manage revocation of compromised cipher suites for sessions currently active using the compromised cipher suites, for multiple network administrator subscribers, independent of the underlying configuration of the SSL client applications within networks monitored by each of the network administrators.

FIG. 8 illustrates a block diagram of one example of a computer system in which one embodiment of the invention may be implemented. The one or more embodiments of the present invention may be performed in a variety of systems and combinations of systems, made up of functional components, such as the functional components described with reference to a computer system 800 and may be communicatively connected to a network, such as network 802.

Computer system 800 includes a bus 822 or other communication device for communicating information within computer system 800, and at least one hardware processing device, such as processor 812, coupled to bus 822 for processing information. Bus 822 preferably includes low-latency and higher latency paths that are connected by bridges and adapters and controlled within computer system 800 by multiple bus controllers. When implemented as a server or node, computer system 800 may include multiple processors designed to improve network servicing power.

Processor 812 may be at least one general-purpose processor that, during normal operation, processes data under the control of software 850, which may include at least one of application software, an operating system, middleware, and other code and computer executable programs accessible from a dynamic storage device such as random access memory (RAM) 814, a static storage device such as Read Only Memory (ROM) 816, a data storage device, such as mass storage device 818, or other data storage medium. Software 850 may include, but is not limited to, code, applications, protocols, interfaces, and processes for controlling one or more systems within a network including, but not limited to, an adapter, a switch, a server, a cluster system, and a grid environment.

Computer system 800 may communicate with a remote computer, such as server 840, or a remote client. In one example, server 840 may be connected to computer system 800 through any type of network, such as network 802, through a communication interface, such as network interface 832, or over a network link that may be connected, for example, to network 802.

In the example, multiple systems within a network environment may be communicatively connected via network 802, which is the medium used to provide communications links between various devices and computer systems communicatively connected. Network 802 may include permanent connections such as wire or fiber optics cables and temporary connections made through telephone connections and wireless transmission connections, for example, and may include routers, switches, gateways and other hardware to enable a communication channel between the systems connected via network 802. Network 802 may represent one or more of packet-switching based networks, telephony based networks, broadcast television networks, local area and wire area networks, public networks, and restricted networks.

Network 802 and the systems communicatively connected to computer 800 via network 802 may implement one or more layers of one or more types of network protocol stacks which may include one or more of a physical layer, a link layer, a network layer, a transport layer, a presentation layer, and an application layer. For example, network 802 may implement one or more of the Transmission Control Protocol/Internet Protocol (TCP/IP) protocol stack or an Open Systems Interconnection (OSI) protocol stack. In addition, for example, network 802 may represent the worldwide collection of networks and gateways that use the TCP/IP suite of protocols to communicate with one another. Network 802 may implement a secure HTTP protocol layer or other security protocol for securing communications between systems.

In the example, network interface 832 includes an adapter 834 for connecting computer system 800 to network 802 through a link and for communicatively connecting computer system 800 to server 840 or other computing systems via network 802. Although not depicted, network interface 832 may include additional software, such as device drivers, additional hardware and other controllers that enable communication. When implemented as a server, computer system 800 may include multiple communication interfaces accessible via multiple peripheral component interconnect (PCI) bus bridges connected to an input/output controller, for example. In this manner, computer system 800 allows connections to multiple clients via multiple separate ports and each port may also support multiple connections to multiple clients.

In one embodiment, the operations performed by processor 812 may control the operations of flowchart of FIGS. 9-15 and other operations described herein. Operations performed by processor 812 may be requested by software 850 or other code or the steps of one or more embodiments of the invention might be performed by specific hardware components that contain hardwired logic for performing the steps, or by any combination of programmed computer components and custom hardware components. In one embodiment, one or more components of computer system 800, or other components, which may be integrated into one or more components of computer system 800, may contain hardwired logic for performing the operations of flowcharts in FIGS. 9-15.

In addition, computer system 800 may include multiple peripheral components that facilitate input and output. These peripheral components are connected to multiple controllers, adapters, and expansion slots, such as input/output (I/O) interface 826, coupled to one of the multiple levels of bus 822. For example, input device 824 may include, for example, a microphone, a video capture device, an image scanning system, a keyboard, a mouse, or other input peripheral device, communicatively enabled on bus 822 via I/O interface 826 controlling inputs. In addition, for example, output device 820 communicatively enabled on bus 822 via I/O interface 826 for controlling outputs may include, for example, one or more graphical display devices, audio speakers, and tactile detectable output interfaces, but may also include other output interfaces. In one or more alternate embodiments of the invention, additional or alternate input and output peripheral components may be added.

With respect to FIG. 8, the one or more embodiments of the invention may be a system, a method, and/or a computer program product. The computer program product may include a computer readable storage medium (or media) having computer readable program instructions thereon for causing a processor to carry out aspects of the one or more embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the one or more embodiments of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software project, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of one or more embodiments of the invention.

Aspects of one or more embodiments of the invention are described herein with reference to flowchart illustrations and/or block diagrams of methods, apparatus (systems), and computer program products according to one or more embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to one or more various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 8 may vary. Furthermore, those of ordinary skill in the art will appreciate that the depicted example is not meant to imply architectural limitations with respect to one or more embodiments of the invention.

Figure 9:
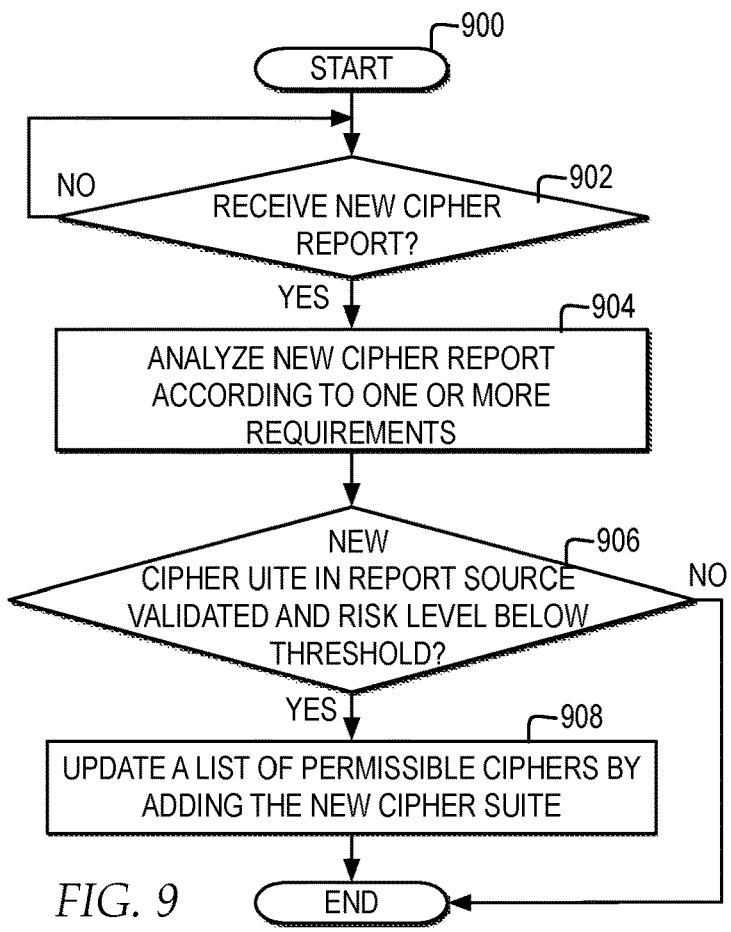
FIG. 9 illustrates one example of a high level logic flowchart of a process and computer program for dynamically updating new valid cipher suites allowed for secured sessions in a list of valid cipher suites maintained by a centralized service.

FIG. 9 illustrates a high level logic flowchart of a process and computer program for dynamically updating new valid cipher suites allowed for secured sessions in a list of valid cipher suites maintained by a centralized service.

In one example, the process and program starts at block 900 and thereafter proceeds to block 902. Block 902 illustrates a determination whether a new cipher report is received by a centralized service. At block 902, if a new cipher report is received, then the process passes to block 904. Block 904 illustrates analyzing the new cipher report according to one or more requirements, such as authentication of the source and risk assessment level. Next, block 906 illustrates a determination whether the new cipher suite in the report has a source that is validated and a risk level below a selected threshold. At block 906, if the new cipher suite in the report does not have a source that is validated or does not have a risk level below a selected threshold, then the process ends without updating the list of permissible ciphers. At block 906, if the new cipher suite in the report has a source that is validated and has a risk level below a selected threshold, then the process passes to block 908. Block 908 illustrates updating a list of permissible ciphers by adding the new cipher suite to the list, and the process ends.

Figure 10:
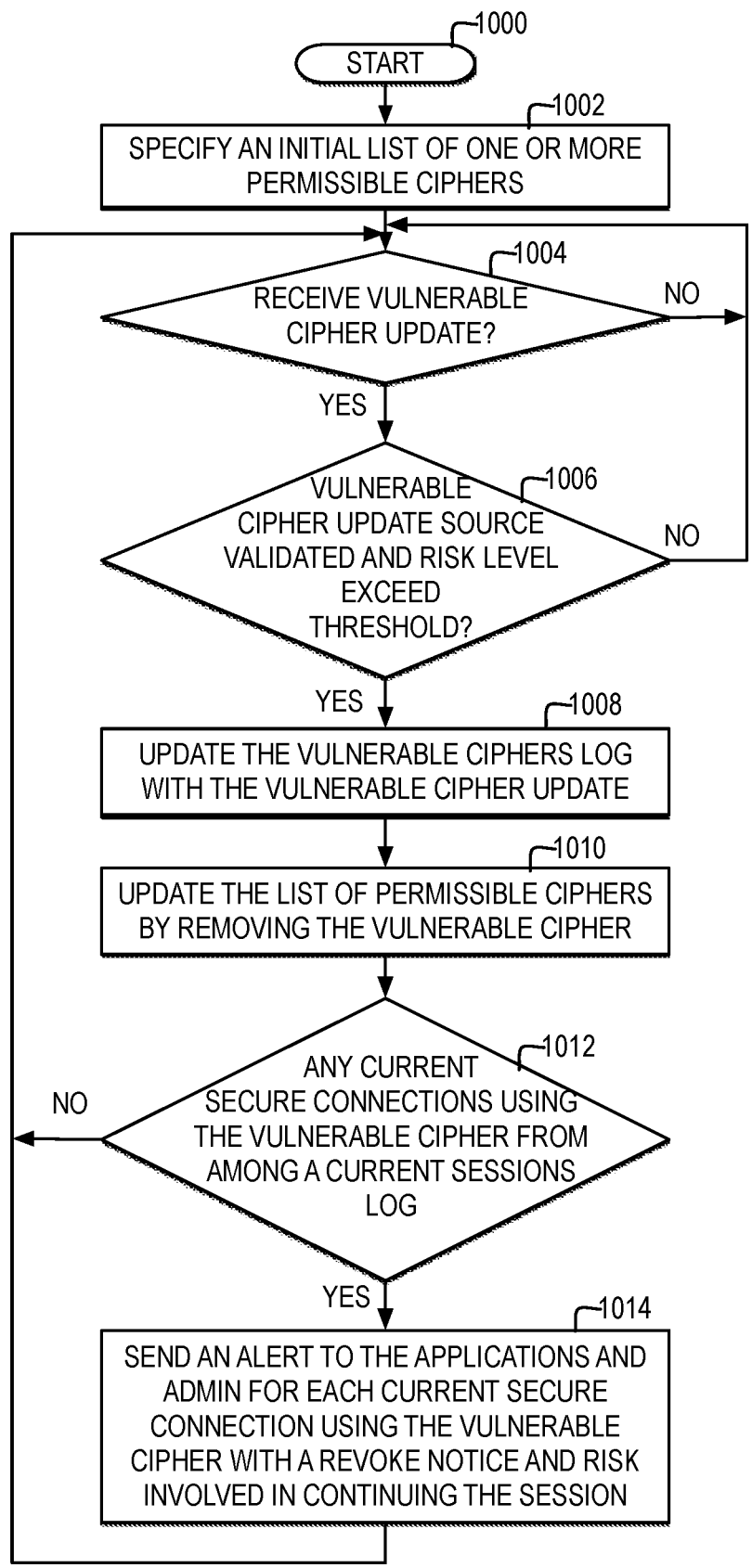
FIG. 10 illustrates one example of a high level logic flowchart of a process and computer program for dynamically removing vulnerable cipher suites from a list of valid cipher suites maintained by a centralized service and dynamically revoking, by the centralized service, current sessions using the vulnerable cipher suites.

FIG. 10 illustrates a high level logic flowchart of a process and computer program for dynamically removing vulnerable cipher suites from a list of valid cipher suites maintained by a centralized service and dynamically revoking, by the centralized service, current sessions using the vulnerable cipher suites.

In one example, the process starts at block 1000 and thereafter proceeds to block 1002. Block 1002 illustrates specifying an initial list of one or more permissible ciphers. Next, block 1004 illustrates a determination whether a vulnerable cipher update is received. At block 1004, if a vulnerable cipher update is received, then the process passes to block 1006. Block 1006 illustrates a determination whether the vulnerable cipher update source is validated and the risk level of the vulnerable cipher exceeds a threshold. At block 1006, if the vulnerable cipher update source is not validated or the risk level of the vulnerable cipher does not exceed a threshold, then the process returns to block 1004. At block 1006, if the vulnerable cipher update source is validated and the risk level of the vulnerable cipher exceeds a threshold, then the process passes to block 1008. Block 1008 illustrates updating the vulnerable ciphers log with the vulnerable cipher update. Next, block 1010 illustrates updating the list of permissible ciphers by removing the vulnerable cipher from the list of permissible ciphers. Thereafter, block 1012 illustrates a determination whether there are any current secure connections using the vulnerable cipher from among a current sessions log. At block 1012, if there are not any current secure connections using the vulnerable ciphers from among a current sessions log, then the process ends. At block 1012, if there are current secure connections using the vulnerable ciphers from among a current sessions log, then the process passes to block 1014. Block 1014 illustrates sending an alert to the applications and admin for each current secure connection using the vulnerable cipher with a revoke notice and the risk involved in continuing the session, and the process ends.

Figure 11:
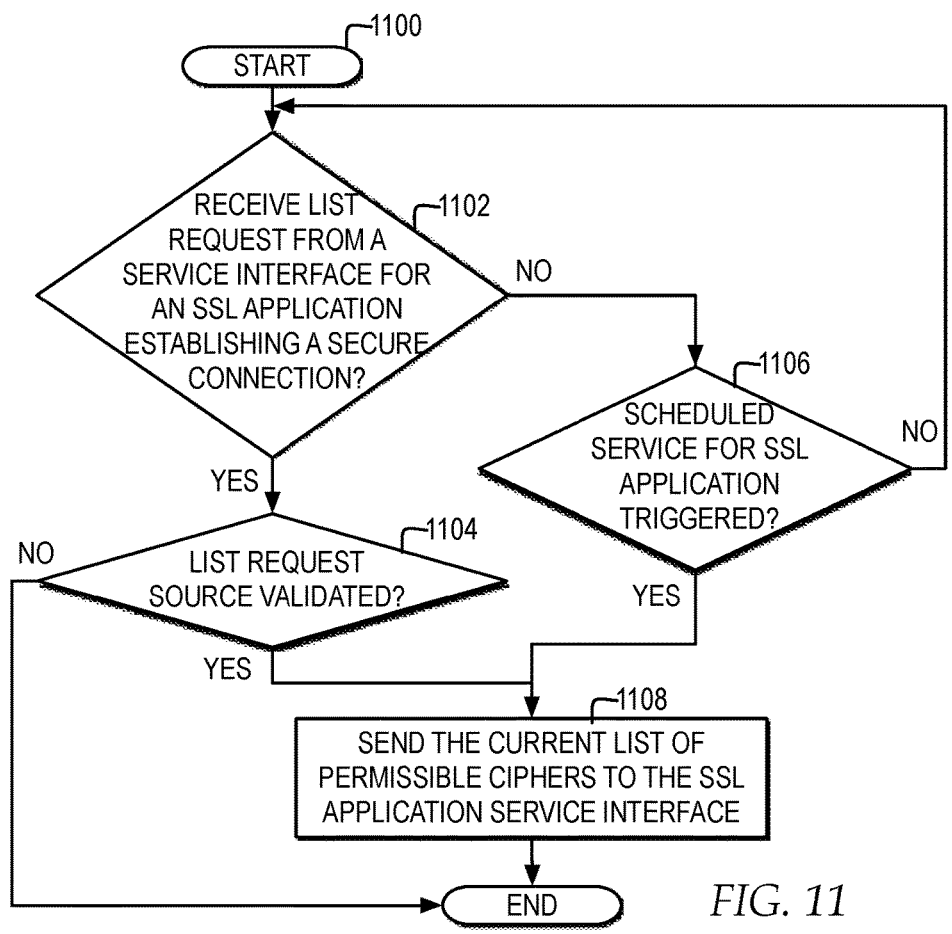
FIG. 11 illustrates one example of a high level logic flowchart of a process and computer program for dynamically managing, from a centralized service, valid cipher suites provided to SSL applications for secured connections.

FIG. 11 illustrates a high level logic flowchart of a process and computer program for dynamically managing, from a centralized service, valid cipher suites provided to SSL applications for secured connections.

In one example, the process and computer program starts at block 1100 and thereafter proceeds to block 1102. Block 1102 illustrates a determination whether a list request is received from an SSL application establishing a secure connection. At block 1102, if a list request is received from an SSL application establishing a secure connection, then the process passes to block 1104. Block 1104 illustrates a determination whether the list request source is validated. At block 1104, if the list request source is not validated as a subscriber, then the process ends. At block 1104, if the list request source is validated as a subscriber, then the process passes to block 1108. Block 1108 illustrates sending the current list of permissible ciphers to the SSL application service interface, and the process ends.

At block 1102, if a list request is not received from an SSL application establishing a secure connection, then the process passes to block 1106. Block 1106 illustrates a determination whether a scheduled service for an SSL application is triggered. At block 1106, if the scheduled service for an SSL application is not triggered, then the process returns to block 1102. At block 1106, if the scheduled service for an SSL application is triggered, then the process passes to block 1108. In one example, the scheduled service for an SLL application may be triggered according to a schedule in a subscriber service or according to an event, such as a change to the list of permissible ciphers.

Figure 12:
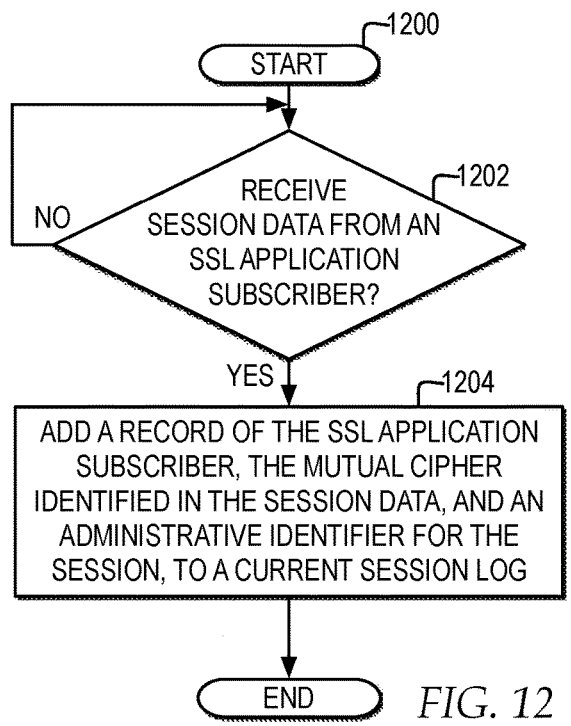
FIG. 12 illustrates one example of a high level logic flowchart of a process and computer program for maintaining a current session log by a centralized service.

FIG. 12 illustrates a high level logic flowchart of a process and computer program for maintaining a current session log by a centralized service.

In one example, the process and computer program starts at block 1200 and thereafter proceeds to block 1202. Block 1202 illustrates a determination whether any session data is received from an SSL application subscriber. At block 1202, if session data is received from an SSL application subscriber, then the process passes to block 1204. Block 1204 illustrates adding a record of the SSL application subscriber, the mutual cipher identified in the session data, and an administrative identifier for the session, to a current session log, and the process ends.

Figure 13:
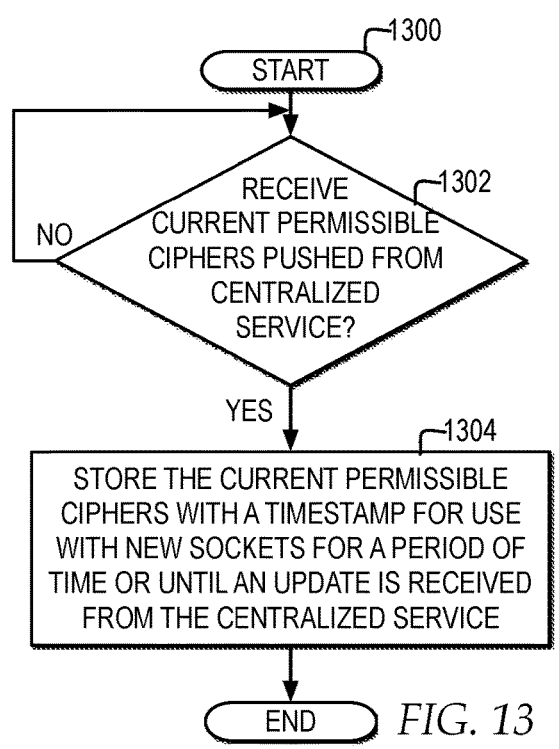
FIG. 13 illustrates one example of a high level logic flowchart of a process and computer program for managing a list of permissible ciphers, indicating valid ciphers, pushed by the centralized service to a service interface according to a scheduled service.

FIG. 13 illustrates a high level logic flowchart of a process and computer program for managing a list of permissible ciphers, indicating valid ciphers, pushed by the centralized service to a service interface according to a scheduled service.

In one example, the process and computer program starts at block 1300 and thereafter proceeds to block 1302. Block 1302 illustrates a determination whether any current permissible ciphers are received, pushed by the centralized service according to a scheduled service. At block 1302, if current permissible ciphers are received, pushed by the centralized service according to a scheduled service, then the process passes to block 1304. Block 1304 illustrates storing the current permissible ciphers with a timestamp for use with new sockets for a period of time or until an update is received from the centralized service, and the process ends.

Figure 14:
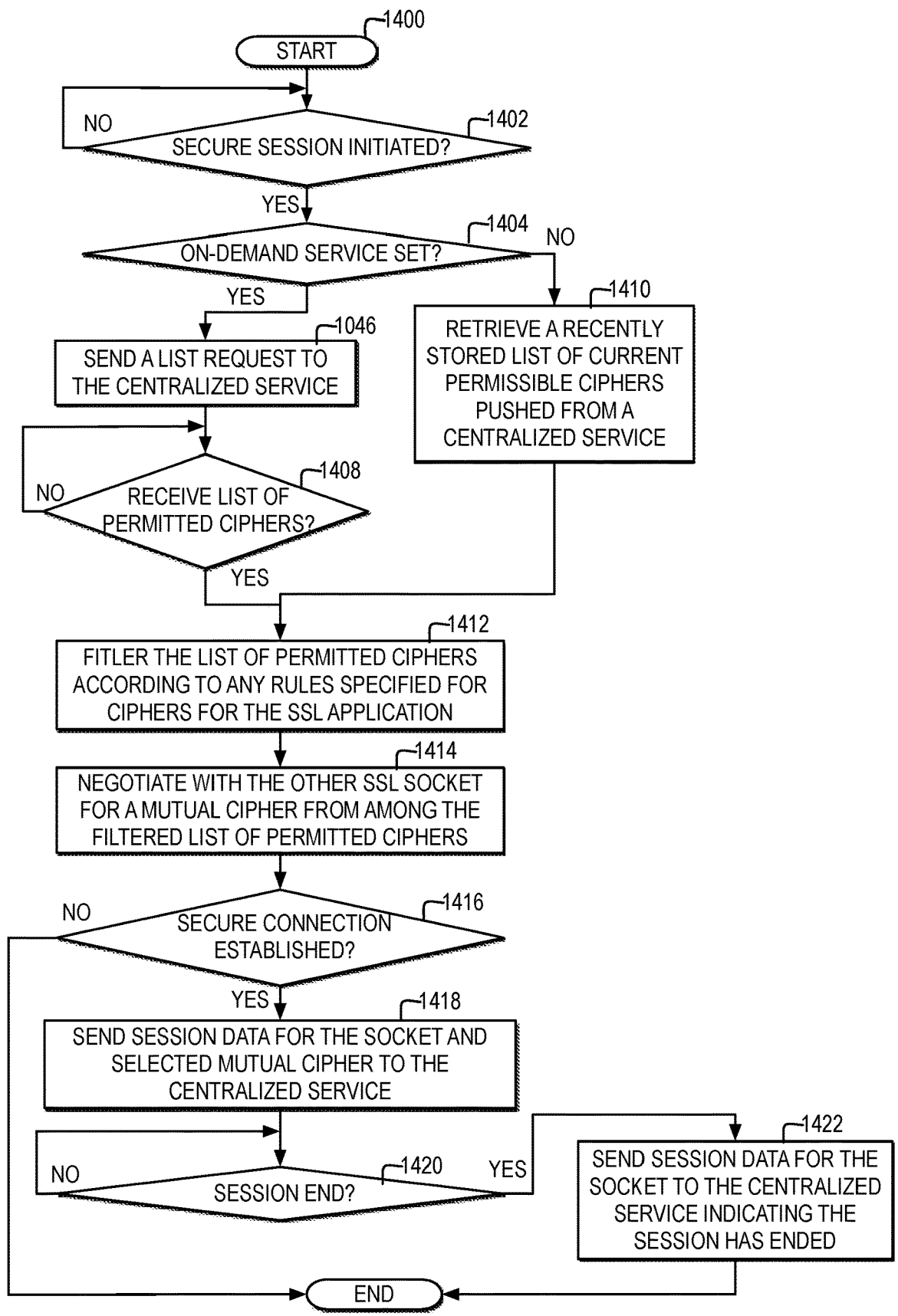
FIG. 14 illustrates one example of a high level logic flowchart of a process and computer program for dynamically managing access to valid cipher suites, by SSL applications, from a centralized service for use in secured connections.

FIG. 14 illustrates a high level logic flowchart of a process and computer program for dynamically managing access to valid cipher suites, by SSL applications, from a centralized service for use in secured connections.

In one example, the process and computer program starts at block 1400 and thereafter proceeds to block 1402. Block 1402 illustrates a determination whether a secure session is initiated. At block 1402, if a secure session is initiated, then the process passes to block 1404. Block 1404 illustrates a determination whether on-demand service is set. At block 1404, if on-demand service is not set, then the process passes to block 1410. Block 1410 illustrates retrieving a recently stored list of current permissible ciphers pushed from a centralized service, and the process passes to block 1412.

Returning to block 1404, if on-demand service is set, then the process passes to block 1406. Block 1406 illustrates sending a list request to the centralized service. Next, block 1408 illustrates a determination whether a list of permitted ciphers is received from the centralized service. At block 1408, once a list of permitted ciphers is received from the centralized service, then the process passes to block 1412.

Block 1412 illustrates filtering the list of permitted ciphers according to any rules specified for ciphers for the SSL application. Next, block 1414 illustrates negotiating with the other SSL socket for a mutual cipher from among the filtered list of permitted ciphers. Thereafter, block 1416 illustrates a determination whether a secure connection is established. At block 1416, if a secure connection is not established, then the process ends. At block 1416, if a secure connection is established, then the process passes to block 1418. Block 1418 illustrates sending session data for the socket and selected mutual cipher suite to the centralized service. Next, block 1420 illustrates a determination whether the session has ended. At block 1420, if the session ends, then the process passes to block 1422. Block 1422 illustrates sending session data for the socket to the centralized service indicating the session has ended.

Figure 15:
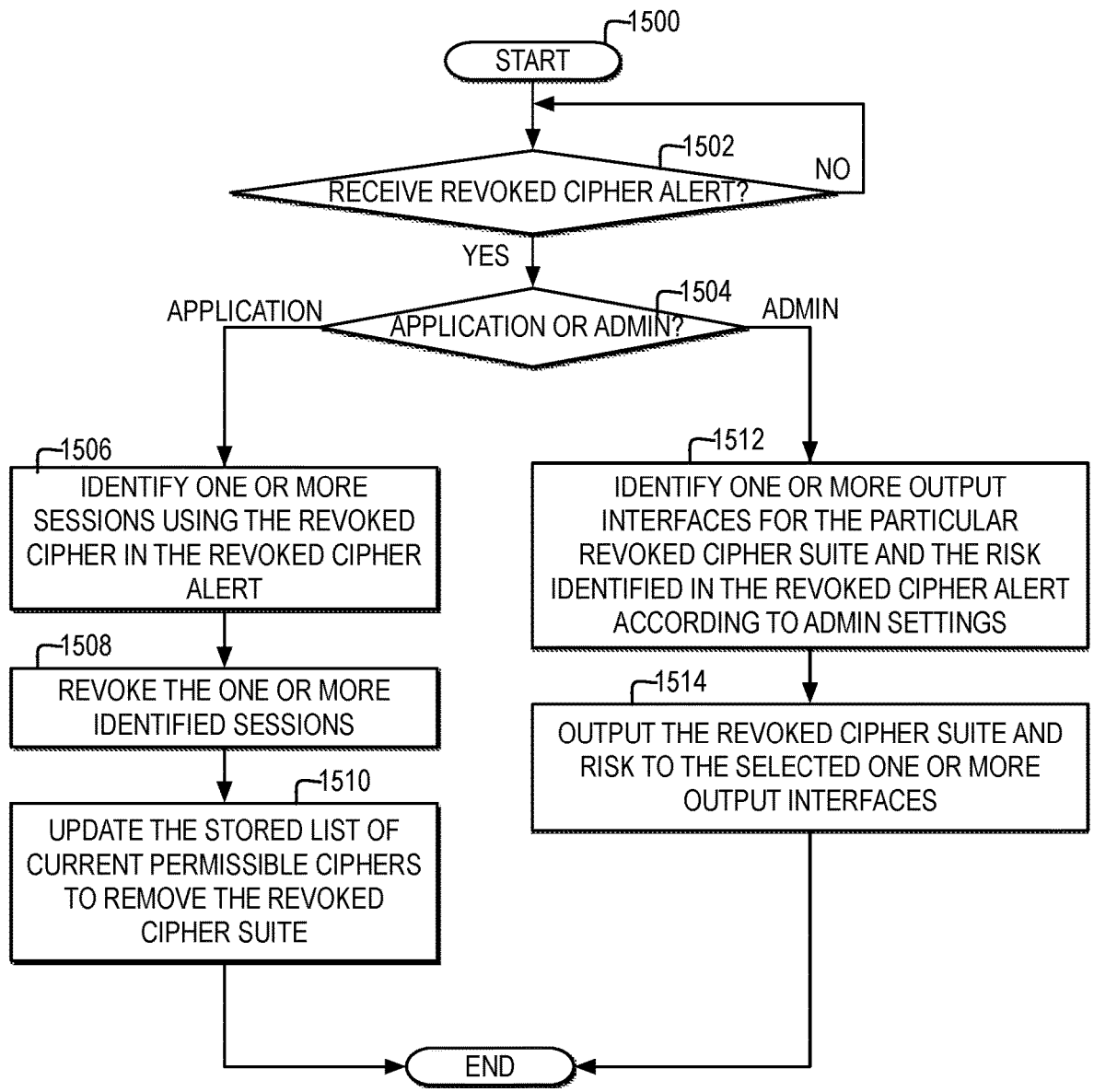
FIG. 15 illustrates one example of a high level logic flowchart of a process and computer program for dynamically managing access to valid cipher suites, by SSL applications, from a centralized service for use in secured connections.

FIG. 15 illustrates a high level logic flowchart of a process and computer program for dynamically managing access to valid cipher suites, by SSL applications, from a centralized service for use in secured connections.

In one example, the process and computer program start at block 1500 and thereafter proceed to block 1502. Block 1502 illustrates a determination whether a revoke cipher alert is received by a service interface from a centralized service. At block 1502, if a revoked cipher alert is received by a service interface from a centralized service, then the process passes to block 1504. Block 1504 illustrates a determination whether the service interface services an SSL application or an administrator. At block 1504, if the service interface services an SSL application, then the process passes to block 1506. At block 1504, if the service interface services an administrator interface, then the process passes to block 1512.

Block 1506 illustrates identifying one or more sessions using the revoked cipher in the revoked cipher alert. Next, block 1508 illustrates revoking the one or more identified sessions. Thereafter, block 1510 illustrates updating the stored list of current permissible ciphers to remove the revoked cipher suite, and the process ends.

Block 1512 illustrates identifying one or more output interfaces for the particular revoked cipher suite and the risk identified in the revoked cipher alert according to admin settings. Next, block 1514 illustrates outputting the revoked cipher suite and risk to the selected one or more output interfaces, and the process ends.

The terminology used herein is for the purpose of describing particular embodiments only and is not intended to be limiting of one or more embodiments of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to one or more embodiments of the invention in the form disclosed. Many modifications and variations will be apparent to those of ordinary skill in the art without departing from the scope and spirit of the one or more embodiments of the one or more embodiments of the invention. The embodiment was chosen and described in order to best explain the principles of the one or more embodiments of the invention and the practical application, and to enable others of ordinary skill in the art to understand the one or more embodiments of the invention for various embodiments with various modifications as are suited to the particular use contemplated.

While the one or more embodiments of the invention has been particularly shown and described with reference to one or more embodiments, it will be understood by those skilled in the art that various changes in form and detail may be made therein without departing from the spirit and scope of the one or more embodiments of the invention.

What is claimed is:

1. A method, comprising:
    selecting, by a service interface of a secure socket layer (SSL) application hosted on at least one computer system in a hosted network, at least one authorized cipher suite;
    negotiating, by an SSL socket of the SSL application with another SSL socket of another SSL application in the hosted network for a mutual cipher from among the at least one authorized cipher suite and a shared key to encrypt information exchanged during a secure session;
    responsive to establishing a security connection between the SSL socket and the another SSL socket using the selected mutual cipher, sending, by the service interface to a centralized service an identifier of the selected mutual cipher; and
    responsive to receiving, by the service interface, a revoked cipher alert from the centralized service, revoking one or more sessions of the SSL application using a revoked cipher in the revoked cipher alert matching the selected mutual cipher.

2. The method according to claim 1, wherein selecting, by a service interface of an SSL application hosted on at least one computer system in a hosted network, at least one authorized cipher suite further comprises:
    responsive to a secure session phase triggered, sending, by the service interface, a request to the centralized service available in the hosted network for a permission list of at least one cipher suite valid for security connections; and
    responsive to receiving the permission list of the at least one cipher suite from the centralized service, filtering, by the service interface, the permission list according to one or more rules specified for ciphers for the SSL application to select the at least one authorized cipher suite.

3. The method according to claim 2, further comprising:
storing the permission list with a timestamp for use with new sockets by the SSL application for at least one of a period of time and until an update is received from the centralized service.

4. The method according to claim 1, wherein negotiating, by an SSL socket of the SSL application with another SSL socket of another SSL application in the hosted network for a mutual cipher from among the at least one authorized cipher suite and a shared key to encrypt information exchanged during a secure session further comprises:
negotiating, by the SSL socket of the SSL application with the another SSL socket of the another SSL application in the hosted network, wherein the SSL socket and the another SSL socket are endpoints in communication flow between the SSL application and the another SSL application.

5. The method according to claim 1, further comprising:
responsive to establishing a security connection between the SSL socket and the another SSL socket using the selected mutual cipher, storing, by the SSL socket, attributes for controlling the SSL socket by the selected mutual cipher and the session data in an SSL configuration of the SSL application.

6. The method according to claim 1, further comprising:
responsive to receiving, by the service interface, a revoked cipher alert from the centralized service, updating a stored list of current permissible ciphers stored by the SSL client application to remove the revoked cipher.

7. The method according to claim 1, wherein responsive to establishing a security connection between the SSL socket and the another SSL socket using an identifier of the selected mutual cipher, sending, by the service interface to a centralized service the selected mutual cipher further comprises:
sending, by the service interface to the centralized service a session identifier identifying the selected mutual cipher and the SSL socket, wherein the centralized service adds the session identifier to a current session log, wherein responsive to identifying a particular cipher suite is vulnerable, the centralized service searches the current session log to determine if the particular cipher suite matches one or more previously stored mutual cipher suites, wherein responsive to the particular cipher suite matching one or more previously stored mutual cipher suites, the centralized service generates the revoked cipher alert to send to each socket specified in each entry of the current session log for the matching one or more previously stored cipher suites.

8. The method according to claim 1, wherein selecting, by a service interface of an SSL application hosted on at least one computer system in a hosted network, at least one authorized cipher suite further comprises:
selecting, by the service interface of the SSL application, the at least one authorized cipher suite, wherein the service interface is specified in a secure socket layer configuration for specifying the SSL socket.

9. The method according to claim 1, wherein responsive to establishing a security connection between the SSL socket and the another SSL socket using the selected mutual cipher, sending, by the service interface to a centralized service an identifier of the selected mutual cipher further comprises:

sending, by the service interface, the identifier of the selected mutual cipher to the centralized service via an ad hoc network connection between the service interface and the centralized service.

10. A computer system comprising:
one or more processors, one or more computer-readable memories, one or more computer-readable storage devices, and program instructions, stored on at least one of the one or more storage devices for execution by at least one of the one or more processors via at least one of the one or more memories, the stored program instructions comprising:
program instructions to select, by a service interface of a secure socket layer (SSL) application hosted on at least one computer system in a hosted network, at least one authorized cipher suite;
program instructions to negotiate, by an SSL socket of the SSL application with another SSL socket of another SSL application in the hosted network for a mutual cipher from among the at least one authorized cipher suite and a shared key to encrypt information exchanged during a secure session;
program instructions to, responsive to establishing a security connection between the SSL socket and the another SSL socket using the selected mutual cipher, send, by the service interface to a centralized service an identifier of the selected mutual cipher; and
program instructions to, responsive to receiving, by the service interface, a revoked cipher alert from the centralized service, to revoke one or more sessions of the SSL application using a revoked cipher in the revoked cipher alert matching the selected mutual cipher.

11. The computer system according to claim 10, wherein the program instructions to select, by a service interface of an SSL application hosted on at least one computer system in a hosted network, at least one authorized cipher suite further comprise:
program instructions to, responsive to a secure session phase triggered, send, by the service interface, a request to the centralized service available in the hosted network for a permission list of at least one cipher suite valid for security connections; and
program instructions to, responsive to receiving the permission list of the at least one cipher suite from the centralized service, filter, by the service interface, the permission list according to one or more rules specified for ciphers for the SSL application to select the at least one authorized cipher suite.

12. The computer system according to claim 11, the stored program instructions further comprising:
program instructions to store the permission list with a timestamp for use with new sockets by the SSL application for at least one of a period of time and until an update is received from the centralized service.

13. The computer system according to claim 10, wherein the program instructions to negotiate, by an SSL socket of the SSL application with another SSL socket of another SSL application in the hosted network for a mutual cipher from among the at least one authorized cipher suite and a shared key to encrypt information exchanged during a secure session further comprise:
program instructions to negotiate, by the SSL socket of the SSL application with the another SSL socket of the another SSL application in the hosted network, wherein the SSL socket and the another SSL socket are endpoints in communication flow between the SSL application and the another SSL application.

14. The computer system according to claim 10, the stored program instructions further comprising:
   program instructions to, responsive to establishing a security connection between the SSL socket and the another SSL socket using the selected mutual cipher, store, by the SSL socket, attributes for controlling the SSL socket by the selected mutual cipher and the session data in an SSL configuration of the SSL application.

15. The computer system according to claim 10, the stored program instructions further comprising:
   program instructions to, responsive to receiving, by the service interface, a revoked cipher alert from the centralized service, update a stored list of current permissible ciphers stored by the SSL client application to remove the revoked cipher.

16. The computer system according to claim 10, wherein the program instructions to, responsive to establishing a security connection between the SSL socket and the another SSL socket using an identifier of the selected mutual cipher, send, by the service interface to a centralized service the selected mutual cipher, further comprise:
   program instructions to send, by the service interface to the centralized service a session identifier identifying the selected mutual cipher and the SSL socket, wherein the centralized service adds the session identifier to a current session log, wherein responsive to identifying a particular cipher suite is vulnerable, the centralized service searches the current session log to determine if the particular cipher suite matches one or more previously stored mutual cipher suites, wherein responsive to the particular cipher suite matching one or more previously stored mutual cipher suites, the centralized service generates the revoked cipher alert to send to each socket specified in each entry of the current session log for the matching one or more previously stored cipher suites.

17. The computer system according to claim 10, wherein the program instructions to select, by a service interface of an SSL application hosted on at least one computer system in a hosted network, at least one authorized cipher suite further comprise:
   program instructions to select, by the service interface of the SSL application, the at least one authorized cipher suite, wherein the service interface is specified in a secure socket layer configuration for specifying the SSL socket.

18. The computer system according to claim 10, wherein the program instructions, responsive to establishing a security connection between the SSL socket and the another SSL socket using the selected mutual cipher, send, by the service interface to a centralized service an identifier of the selected mutual cipher further comprise:
   program instructions to send, by the service interface, the identifier of the selected mutual cipher to the centralized service via an ad hoc network connection between the service interface and the centralized service.

19. A computer program product comprising one or more computer-readable storage devices and program instructions, stored on at least one of the one or more storage devices, the stored program instructions comprising:
   program instructions to select, by a service interface of a secure socket layer (SSL) application hosted on at least one computer system in a hosted network, at least one authorized cipher suite;
   program instructions to negotiate, by an SSL socket of the SSL application with another SSL socket of another SSL application in the hosted network for a mutual cipher from among the at least one authorized cipher suite and a shared key to encrypt information exchanged during a secure session;
   program instructions to, responsive to establishing a security connection between the SSL socket and the another SSL socket using the selected mutual cipher, send, by the service interface to a centralized service an identifier of the selected mutual cipher; and
   program instructions to, responsive to receiving, by the service interface, a revoked cipher alert from the centralized service, to revoke one or more sessions of the SSL application using a revoked cipher in the revoked cipher alert matching the selected mutual cipher.

20. The computer program product according to claim 19, the stored program instructions further comprising:
   program instructions to, responsive to a secure session phase triggered, send, by the service interface, a request to the centralized service available in the hosted network for a permission list of at least one cipher suite valid for security connections; and
   program instructions to, responsive to receiving the permission list of the at least one cipher suite from the centralized service, filter, by the service interface, the permission list according to one or more rules specified for ciphers for the SSL application to select the at least one authorized cipher suite.

* * * * *